United States Patent
Tanaka et al.

(10) Patent No.: US 8,692,713 B2
(45) Date of Patent: Apr. 8, 2014

(54) RECEIVING DEVICE, RECEIVING METHOD, COMPUTER PROGRAM, AND PORTABLE TERMINAL

(75) Inventors: Katsuyuki Tanaka, Kanagawa (JP); Hideki Takahashi, Kanagawa (JP); Hideki Awata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/703,749

(22) PCT Filed: Jul. 6, 2011

(86) PCT No.: PCT/JP2011/065457
§ 371 (c)(1),
(2), (4) Date: Dec. 12, 2012

(87) PCT Pub. No.: WO2012/008338
PCT Pub. Date: Jan. 19, 2012

(65) Prior Publication Data
US 2013/0094541 A1    Apr. 18, 2013

(30) Foreign Application Priority Data

Jul. 14, 2010    (JP) .................................. 2010-159596

(51) Int. Cl.
*G01S 19/34*    (2010.01)
(52) U.S. Cl.
USPC .................................................... 342/357.74
(58) Field of Classification Search
USPC .......................................... 342/357.74, 357.77
See application file for complete search history.

(56) References Cited

U.S. PATENT DOCUMENTS

| | | | | |
|---|---|---|---|---|
| 5,594,453 A | * | 1/1997 | Rodal et al. | 342/357.65 |
| 5,629,708 A | * | 5/1997 | Rodal et al. | 342/357.63 |

(Continued)

FOREIGN PATENT DOCUMENTS

| JP | 2003-258769 A | 9/2003 |
|---|---|---|
| JP | 4164662 B2 | 10/2008 |

(Continued)

OTHER PUBLICATIONS

International Search Report issued Aug. 9, 2011 in PCT/JP11/065457 Filed Jul. 6, 2011.

(Continued)

*Primary Examiner* — Cassie Galt
(74) *Attorney, Agent, or Firm* — Oblon, Spivak, McClelland, Maier & Neustadt, L.L.P.

(57) ABSTRACT

To provide a receiving device which is capable of reducing average power and peak power by holding pseudo synchronization of a satellite signal during a sleep period. Provided is a receiving device including a receiving unit for receiving a signal from a satellite, a frequency conversion unit for converting a frequency of the received signal into a predetermined intermediate frequency, a synchronization acquisition unit for carrying out synchronization acquisition and for detecting a carrier frequency, and a synchronization holding unit for assigning and setting, per satellite, a phase of the spread code and the carrier frequency to each of a plurality of channels independently provided in a corresponding manner to a plurality of the satellites to synchronously hold the spread code and a carrier and also for demodulating a message included in the intermediate frequency. The synchronization holding unit includes a spreading code generation unit for generating a spreading code synchronized with the spread code, and in a sleep period in which a positioning operation is not carried out, the synchronization holding unit causes only the spreading code generation unit to operate and a counter that the synchronization holding unit refers to also operates.

18 Claims, 16 Drawing Sheets

(56) References Cited

U.S. PATENT DOCUMENTS

| | | | |
|---|---|---|---|
| 6,757,610 B1* | 6/2004 | Mann et al. | 701/478 |
| 7,301,377 B2* | 11/2007 | Tanaka et al. | 327/113 |
| 7,450,062 B2* | 11/2008 | McBurney et al. | 342/357.4 |
| 7,456,782 B2* | 11/2008 | Wang et al. | 342/357.32 |
| 8,044,855 B2* | 10/2011 | Hanabusa | 342/357.74 |
| 8,369,386 B2 | 2/2013 | Takahashi et al. | |
| 2003/0231704 A1 | 12/2003 | Tanaka et al. | |
| 2009/0309792 A1 | 12/2009 | Hanabusa | |
| 2010/0052651 A1 | 3/2010 | Kojima | |

FOREIGN PATENT DOCUMENTS

| | | |
|---|---|---|
| JP | 2009-300274 A | 12/2009 |
| JP | 2010-054507 A | 3/2010 |
| JP | 2010-54507 A | 3/2010 |

OTHER PUBLICATIONS

U.S. Appl. No. 13/806,181, filed Dec. 21, 2012, Tanaka, et al.
Office Action issued Jan. 29, 2013 in Japanese Patent Application No. 2010-159596.

* cited by examiner

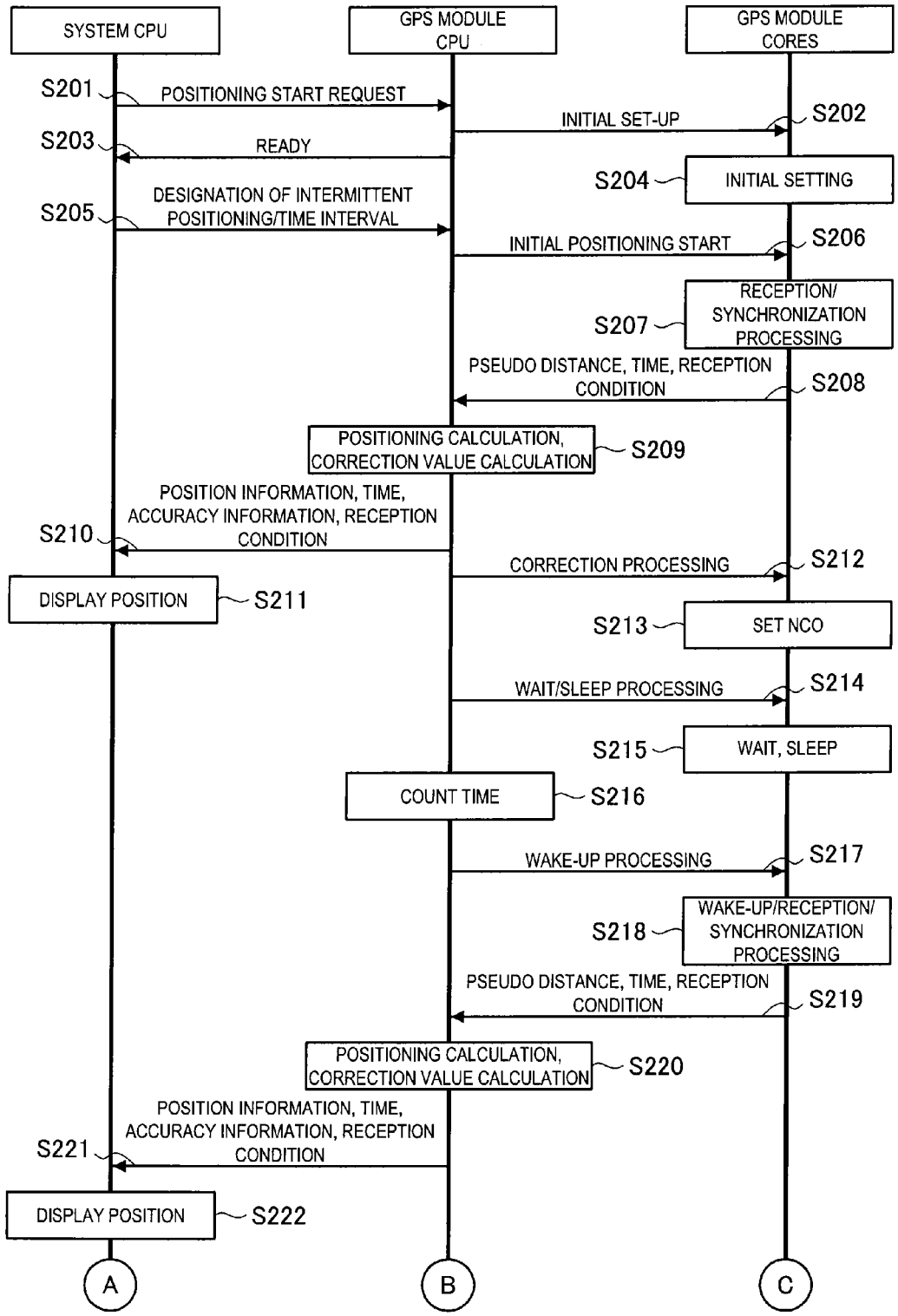

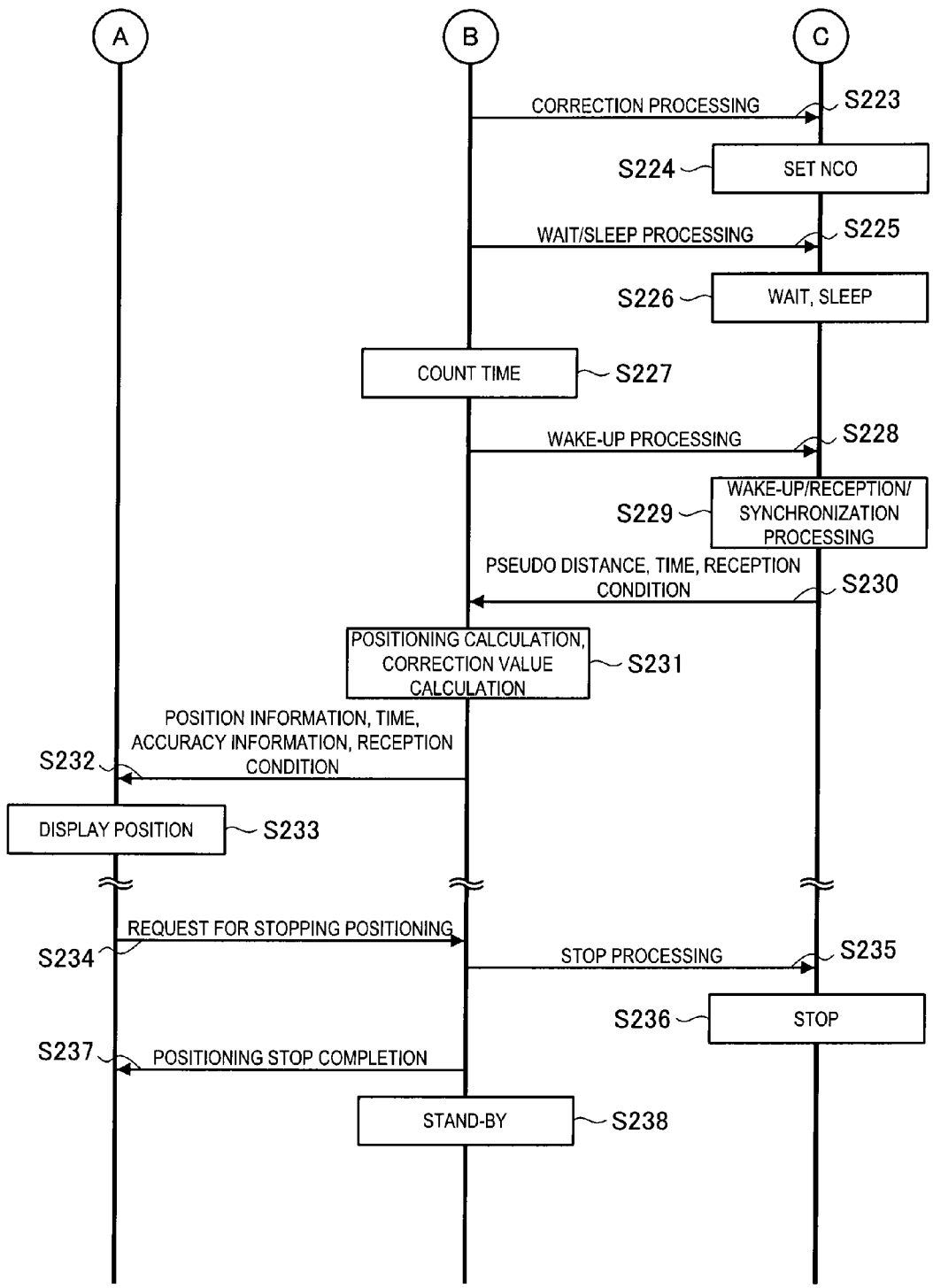

RECEIVING DEVICE, RECEIVING METHOD, COMPUTER PROGRAM, AND PORTABLE TERMINAL

TECHNICAL FIELD

The present disclosure relates to a receiving device, a receiving method, a computer program, and a portable terminal.

BACKGROUND ART

In recent years, a positioning function using a GPS (Global Positioning System) is incorporated into various electronic devices such as a car navigation device, a mobile phone, and a digital still camera. Typically, when the GPS is used in the electronic device, a GPS module receives a signal from four or more GPS satellites and measures a position of the device based on the received signal, and the measurement result is notified to the user via, for example, a screen of a display device. To be more specific, the GPS module demodulates the received signal to acquire orbital data of each GPS satellite, and obtains the device's three-dimensional position by solving simultaneous equations with the orbital data, time information, and a delay time of the received signal. The reason for requiring the four or more GPS satellites, from which the signal is received, is to remove influence of an error between the time inside the module and the time of the satellite.

Here, the signal (the L1 band, a C/A code) transmitted from the GPS satellite results from data of 50 bps being subjected to spread spectrum with a Gold code of a code length of 1023 and a chip rate of 1.023 MHz, and the spread spectrum signal further being subjected to BPSK (Binary Phase Shift Keying) modulation using a carrier of 1575.42 MHz. Therefore, to receive the above signal from the GPS satellite, the GPS module needs to synchronize the spread code, the carrier, and the data.

Typically, the GPS module incorporated into the electronic device converts a carrier frequency of the received signal into an intermediate frequency (IF) of within some MHz, and then carries out the synchronization processing described above. A typical intermediate frequency is, for example, 4.092 MHz, 1.023 MHz, and 0 Hz. Usually, the signal strength of the received signal is smaller than that of a thermal noise, and the S/N is lower than 0 dB. However, the signal can be demodulated by a processing gain of a spread spectrum method. In the case of a GPS signal, the processing gain with respect to the data length of 1 bit is 10 Log (1.023 MHz/50)≈43 dB, for example.

For many years, the GPS receivers had been mainly used for car navigation systems. However, in recent years, the GPS receivers have been incorporated into digital still cameras (hereinafter, DSC) and the like, and the market of the GPS receivers tends to expand. In terms of performance, sensitivity has been improved, and the GPS receivers having receiver sensitivity of −150 to −160 dBm have been popular. This is contributed by the fact that a large-scale circuit can be produced at low cost because of enhancement of the degree of integration of an IC by miniaturization of semiconductor processing. Power consumption has been also lowered.

In the use of the GPS receiver for a typical car navigation system, basically, continuous positioning (typically, once every second) is performed. Since the power is supplied from a large battery of the car, the power consumption during operation has not often become a problem. Meanwhile, a simplified navigation system (personal navigation device—PND) of recent years, a mobile phone, a DSC, and other mobile devices have a small battery, and those except the PND do not necessarily require the continuous positioning. For the mobile devices, battery survival time is a very important element, and the case must be avoided in which the battery survival time is extremely shortened because the incorporated GPS receiver is operated as before, so that the primary function of the mobile devices is impaired. As described above, reduction of the power consumption of the GPS receiver of recent years has been enhanced. However, the power consumption during the continuous operation is not sufficient for the mobile devices. Therefore, there are many cases in which the mobile devices operate with lower power by intermittent operation. Frequency of positioning can be reduced by the intermittent operation, and when the positioning is not performed, by decreasing most of the power except the power of a part of the circuit or of the circuit as a whole, an effect of reliably reducing the average power can be expected.

The intermittent operation in the GPS receiver is to cause the GPS receiver to be in a sleep condition when the positioning is not performed, in which the operation other than that of a minimum necessary circuit stops, so that an hourly average of the power is decreased and the power is lowered. The minimum necessary circuit that operates during the sleep condition is typically a real time clock having a low frequency (hereinafter, RTC, the frequency is typically 32.768 kHz) and a back-up memory for storing the satellite's orbit, time information, and the like. To function the intermittent operation, it is necessary to reestablish synchronization of the received signal from each satellite in a short time after returning from the sleep condition.

The simplest way to reestablish the synchronization of the received signal is to carry out, after returning from the sleep condition, an initial set-up that is the same as a normal set-up when the power of the GPS receiver is turned ON. The GPS receiver's normal initial set-up is divided into three types: cold start, warm start, and hot start, depending on whether or not ephemeris and almanac which are orbital information of the satellite are available. The ephemeris is orbital information that is individually transmitted from the satellite and has a short term of validity although it is accurate enough to be used for a positioning calculation. The almanac, on the other hand, is rough orbital information that is commonly transmitted from all of the satellites, has a long term of validity, and is useful to specify an available satellite from which a signal is received. The cold start is used for an initial set-up when neither orbital information is available, the warm start is used for an initial set-up when only the almanac is available, and the hot start is used for an initial set-up when both of the orbital information are available. The former two require about 30 seconds before a start of positioning, whereas the hot start requires few seconds, and even 1 second or less is possible under preferable conditions.

In the method of intermittent operation in which a normal initial set-up of a GPS receiver is carried out for reestablishing the synchronization, it is typical to transfer to the intermittent operation after establishing initial positioning by the cold start or the warm start, and then to carry out the hot start by which the positioning can be performed in a short time. In this method, a synchronization acquisition unit for acquiring the synchronization with respect to the received signal from the satellite operates in the GPS receiver. Since the synchronization acquisition unit has a large processing load, and there are many cases of consuming much larger power than a synchronization holding unit which holds the synchronization, it is inconvenient when a battery is defined by the peak power rather than the average power.

To reduce the peak power, there is a way to reestablish the synchronization using only the synchronization holding unit rather than using the synchronization acquisition unit. In order to realize this, it is necessary to have a method for maintaining highly accurate time information in the sleep period, and for restarting a synchronization holding circuit with accuracy of within 1 chip (1/1.023μ seconds) of a spreading code after returning from the sleep condition. When there is the accuracy of within 1 chip of the spreading code, a delay-locked loop (DLL) for carrying out the synchronization of the spreading code can synchronize the spread code instantly. Typically, the synchronization holding unit has a plurality of synchronization holding circuits for holding the synchronization, simultaneously receives signals from a plurality of satellites, and holds the synchronization with the respective satellites. However, because of accuracy and stability of an oscillation frequency of an oscillator which measures time, the longer the sleep period is, the more difficult it becomes to maintain the highly accurate time information.

To maintain the highly accurate time information during the sleep period, there is a way to store a result of a low accurate RTC frequency (several tens of ppm) measured by a counter of a highly accurate GPS reception oscillator (it is typical to use a temperature-compensated TCXO, and 0.5 ppm is an example for GPS) before the sleep, and, after returning from the sleep condition, to correct an error to the elapsed time by the RTC using the measured result of before the sleep (Patent Literature 1). By using this method, only the RTC operates during the sleep while the GPS reception oscillator is stopped, and the synchronization can be reestablished after returning from the sleep without using the synchronization acquisition unit, whereby considerable reduction of the power can be expected.

CITATION LIST

Patent Literature

Patent Literature 1: JP 4164662B

SUMMARY OF INVENTION

Technical Problem

However, whether or not instant reestablishment of the synchronization is possible with only the synchronization holding unit depends, in addition to a moving speed of the GPS receiver itself, on accuracy of measurement, a length of sleep time, and stability of the RTC and the GPS reception oscillator during the sleep. Especially, in practice, because stability of the RTC which is not normally temperature-compensated becomes a dominant factor, the measurement result changes through time, and a shift occurs in error correction after returning from the sleep. Therefore, the sleep time cannot be taken so long. Since a certain period of time is necessary for a positioning calculation after returning from the sleep, there is no advantage of carrying out the initial positioning by the hot start in terms of the average power if an ON/OFF ratio of the intermittent operation cannot be large. Also, dispersion of stability of the RTC makes operation guarantee difficult with respect to mass-produced products.

A request to the GPS receiver differs depending on the nature of the product into which the GPS receiver is incorporated. However, for an intermediate request between the continuous positioning like a car navigation system and the single positioning typically used in the DSC, that is, for the request in which semi-continuous positioning is desired with low power by reducing frequency of positioning like position-data logging, a highly stable intermittent operation without restriction of the RTC's stability is expected.

Accordingly, the present disclosure has been realized in view of the above problem, and an object of the disclosure is to provide a novel and improved receiving device, receiving method, computer program, and portable terminal which are capable of reducing the average power and the peak power by holding pseudo synchronization of the satellite signal in the sleep period.

Solution to Problem

According to one aspect of the present disclosure in order to achieve the above-mentioned object, there is provided a receiving device including a receiving unit for receiving a signal from a satellite in a global positioning system, a frequency conversion unit for converting a frequency of the signal received by the receiving unit into a predetermined intermediate frequency, a synchronization acquisition unit for carrying out synchronization acquisition to detect a phase of a spread code of a signal of the intermediate frequency converted by the frequency conversion unit, and for detecting a carrier frequency of the signal of the intermediate frequency, a synchronization holding unit for assigning and setting, per satellite, the phase of the spread code detected by the synchronization acquisition unit and the carrier frequency detected by the synchronization acquisition unit to each of a plurality of channels independently provided in a corresponding manner to a plurality of the satellites, for synchronously holding the spread code and a carrier by using the set phase of the spread code and the set carrier frequency, and also for demodulating a message included in the intermediate frequency, and a control unit for executing operation control including a positioning calculation using the message demodulated by the synchronization holding unit. The synchronization holding unit includes a spreading code generation unit for generating a spreading code synchronized with the spread code, and refers to a counter operating with a clock oscillated from a temperature-compensated oscillator oscillating at a predetermined frequency, and in a sleep period in which a positioning operation is not carried out, the synchronization holding unit causes only the spreading code generation unit to operate and the counter that the synchronization holding unit refers to also operates.

The spreading code generation unit may include a numeric controlled oscillator, and a spread code generator for generating a spread code upon receiving an output signal from the numeric controlled oscillator.

The numeric controlled oscillator may hold a value of the numeric controlled oscillator immediately before entering the sleep period as a value of the numeric controlled oscillator in the sleep period.

The control unit may calculate an average value of values of the numeric controlled oscillator in a predetermined period immediately before entering the sleep period, and the numeric controlled oscillator holds the average value as a value of the numeric controlled oscillator in the sleep period.

The control unit may correct a value of the numeric controlled oscillator at a time when the sleep period ends in consideration of a change amount of Doppler shift of the satellite in the sleep period.

The control unit may execute the correction before entering the sleep period using a time for returning from the sleep period.

The receiving unit, the frequency conversion unit, the synchronization acquisition unit, and the control unit may stop operation in the sleep period.

Further, according to another aspect of the present disclosure in order to achieve the above-mentioned object, there is provided a receiving method including: receiving a signal from a satellite in a global positioning system; converting a frequency of the received signal into a predetermined intermediate frequency; carrying out synchronization acquisition for detecting a phase of a spread code of a signal of the converted intermediate frequency, and detecting a carrier frequency of the signal of the intermediate frequency; by using a synchronization holding unit for generating a spreading code synchronized with the spread code and referring to a counter operating with a clock oscillated from a temperature-compensated oscillator oscillating at a predetermined frequency, assigning and setting, per satellite, the detected phase of the spread code and the detected carrier frequency to each of a plurality of channels independently provided in a corresponding manner to a plurality of the satellites, synchronously holding the spread code and a carrier by using the set phase of the spread code and the set carrier frequency, and also demodulating a message included in the intermediate frequency; executing operation control including a positioning calculation using the demodulated message; and in a sleep period in which a positioning operation is not carried out, the synchronization holding unit causing only the spreading code generation unit to operate, and also the counter that the synchronization holding unit refers to operating.

Further, according to another aspect of the present disclosure in order to achieve the above-mentioned object, there is provided a program for causing a computer to execute: receiving a signal from a satellite in a global positioning system; converting a frequency of the received signal into a predetermined intermediate frequency; carrying out synchronization acquisition for detecting a phase of a spread code of a signal of the converted intermediate frequency, and detecting a carrier frequency of the signal of the intermediate frequency; by using a synchronization holding unit for generating a spreading code synchronized with the spread code and referring to a counter operating with a clock oscillated from a temperature-compensated oscillator oscillating at a predetermined frequency, assigning and setting, per satellite, the detected phase of the spread code and the detected carrier frequency to each of a plurality of channels independently provided in a corresponding manner to a plurality of the satellites, synchronously holding the spread code and a carrier by using the set phase of the spread code and the set carrier frequency, and also demodulating a message included in the intermediate frequency; executing operation control including a positioning calculation using the demodulated message; and in a sleep period in which a positioning operation is not carried out, the synchronization holding unit causing only the spreading code generation unit to operate, and also the counter that the synchronization holding unit refers to operating.

Further, according to another aspect of the present disclosure in order to achieve the above-mentioned object, there is provided a portable terminal for transmitting/receiving an instruction and information to/from the receiving device described above.

Advantageous Effects of Invention

According to the present disclosure as described above, a novel and improved receiving device, receiving method, computer program, and portable terminal can be provided which cause only the configuration for holding the pseudo synchronization of the satellite signal during the sleep period to operate, whereby the average power and the peak power can be reduced.

BRIEF DESCRIPTION OF DRAWINGS

FIG. 15A is a flow chart showing operation of the GPS module 10 and the digital still camera 200 according to an embodiment of the present disclosure.

FIG. 15B is a flow chart showing the operation of the GPS module 10 and the digital still camera 200 according to an embodiment of the present disclosure.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that, the description will be given in the following order.

<1. An embodiment of the present disclosure>
[1-1. A hardware configuration of a GPS module according to the present disclosure]
[1-2. A method of synchronization reestablishment]
<2. Description of a device in which the GPS module is built in>
<3. Conclusion>

[1-1. A Hardware Configuration of a GPS Module]

Figure 1:
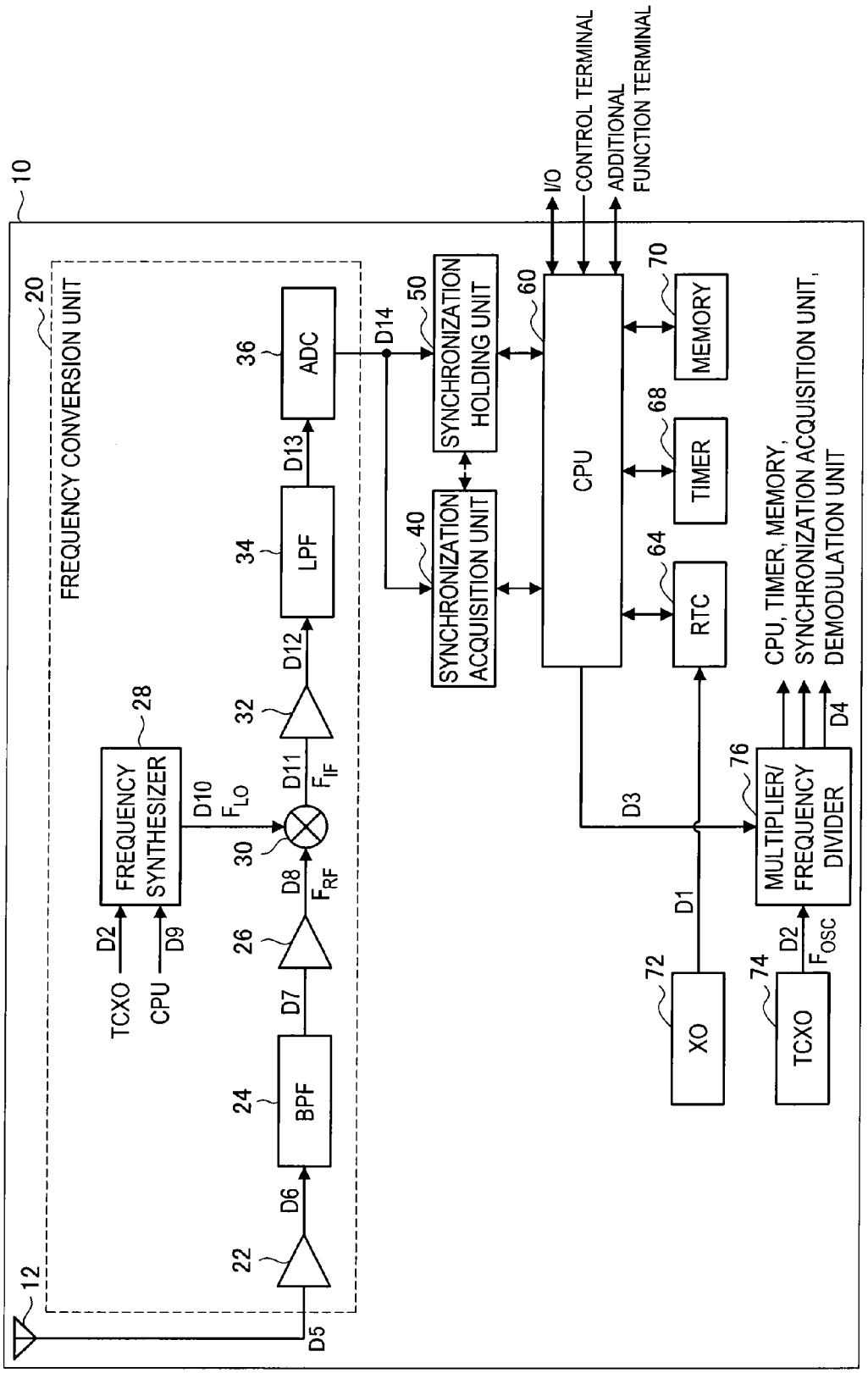
FIG. 1 is a block diagram showing a configuration of a GPS module according to the present disclosure.

First, a hardware configuration of a GPS module according to the present disclosure will be described. FIG. 1 is a block diagram showing an example of a hardware configuration of a GPS module 10 according to the present disclosure. Hereinafter, the hardware configuration of the GPS module will be described with reference to FIG. 1.

Referring to FIG. 1, the GPS module 10 includes an antenna 12, a frequency conversion unit 20, a synchronization acquisition unit 40, a synchronization holding unit 50, a CPU (Central Processing Unit) 60, a RTC (Real Time Clock) 64, a timer 68, a memory 70, an XO (crystal oscillator, X'tal Oscillator) 72, a TCXO (Temperature Compensated X'tal Oscillator) 74, and a multiplier/frequency divider 76.

The XO 72 produces a signal D1 having a predetermined frequency (for example, about 32.768 kHz), and provides the produced signal D1 to the RTC 64. The TCXO 74 produces a signal D2 having a different frequency from the XO 72 (for example, about 16.368 MHz), and provides the produced signal D2 to the multiplier/frequency divider 76 and a frequency synthesizer 28.

The multiplier/frequency divider 76 carries out multiplication and/or division of the signal D2 provided from the TCXO 74 based on an instruction from the CPU 60. Then, the multiplier/frequency divider 76 provides a signal D4, for which the multiplication and/or division has been carried out, to the frequency synthesizer 28 and a ADC 36 of the frequency conversion unit 20, the CPU 60, the timer 68, the memory 70, the synchronization acquisition unit 40, and the synchronization holding unit 50.

The antenna 12 receives a radio signal (for example, an RF signal resulting from a spread carrier of 1575.42 MHz) including a navigation message and the like transmitted from a GPS satellite that is a satellite in a global positioning system, converts the radio signal into an electric signal D5, and provides the electric signal D5 to the frequency conversion unit 20.

The frequency conversion unit 20 includes an LNA (Low Noise Amplifier) 22, a BPF (Band Pass Filter) 24, an amplifier 26, the frequency synthesizer 28, a multiplier 30, an amplifier 32, an LPF (Low Pass Filter) 34, and the ADC (Analog Digital Converter) 36. In order to facilitate digital signal processing, the frequency conversion unit 20 carries out, as shown below, down-conversion of the signal D5 having a high frequency of 1575.42 MHz received by the antenna 12 into a signal D14 having a frequency of about 1.023 MHz, for example.

The LNA 22 amplifies the signal D5 provided from the antenna 12, and provides the amplified signal to the BPF 24. The BPF 24 is configured from a SAW filter (Surface Acoustic Wave Filter), and extracts only a predetermined frequency component from among the frequency components of a signal D6 amplified by the LNA 22, and provides the extracted frequency component to the amplifier 26. The amplifier 26 amplifies a signal D7 (frequency $F_{RF}$) having the frequency component extracted by the BPF 24, and provides the amplified signal to the multiplier 30.

The frequency synthesizer 28 uses the signal D2 provided from the TCXO 74 to generate a signal D10 having a frequency $F_{LO}$ based on an instruction D9 from the CPU 60. Then, the frequency synthesizer 28 provides the generated signal D10 having the frequency $F_{LO}$ to the multiplier 30.

The multiplier 30 multiplies a signal D8 having the frequency $F_{RF}$ provided from the amplifier 26 and the signal D10 having the frequency $F_{LO}$ provided from the frequency synthesizer 28. That is, the multiplier 30 carries out down-conversion of the high-frequency signal into an IF (Intermediate Frequency) signal D11 (for example, a signal having an intermediate frequency of about 1.023 MHz).

The amplifier 32 amplifies the IF signal D11 down-converted by the multiplier 30, and provides the amplified signal to the LPF 34.

The LPF 34 extracts a low-frequency component from among the frequency components of an IF signal D12 amplified by the amplifier 30, and provides a signal D13 having the extracted low-frequency component to the ADC 36. Note that, in FIG. 1, an example has been described in which the LPF 34 is arranged between the amplifier 32 and the ADC 36. However, the BPF can be arranged between the amplifier 32 and the ADC 36.

The ADC 36 converts the IF signal D13 in an analog format, which is provided from the LPF 34, into a signal in a digital format by means of sampling, and provides, one bit at a time, the IF signal D14 converted into the digital format to the synchronization acquisition unit 40 and the synchronization holding unit 50.

The synchronization acquisition unit 40 uses the signal D3 provided from the multiplier/frequency divider 76 to carry out synchronization acquisition with a pseudo-random (PRN: Pseudo-Random Noise) code of the IF signal D14 provided from the ADC 36 based on control by the CPU 60. Further, the synchronization acquisition unit 40 detects a carrier frequency of the IF signal D14. Then, the synchronization acquisition unit 40 provides a phase of the PRN code, the carrier frequency of the IF signal D14, and the like to the synchronization holding unit 50 and the CPU 60.

The synchronization holding unit 50 uses the signal D3 provided from the multiplier/frequency divider 76 to hold the synchronization of the PRN code of the IF signal D14 provided from the ADC 36 and the carrier based on control by the CPU 60. To be more specific, the synchronization holding unit 50 operates with the phase of the PRN code and the carrier frequency of the IF signal D14 provided from the synchronization acquisition unit 40 as initial values. Then, the synchronization holding unit 50 demodulates a navigation message included in the IF signal D14 provided from the ADC 36, and provides the demodulated navigation message, a highly accurate phase of the PRN code, and the carrier frequency to the CPU 60.

The CPU 60 calculates a position and a speed of each GPS satellite based on the navigation message, the phase of the PRN code, and the carrier frequency provided from the synchronization holding unit 50 to calculate the position of the GPS module 10. Further, the CPU 60 may correct time information of the RTC 64 based on the navigation message. Further, the CPU 60 may be connected to a control terminal, an I/O terminal, an additional function terminal, and so on to execute other various control processing.

The RTC 64 uses the signal D1 having a predetermined frequency provided from the XO 72 to measure time. The time measured by the RTC 64 is properly corrected by the CPU 60.

The timer 68 uses the signal D4 provided from the multiplier/frequency divider 76 to time. The timer 68 is referred to when the CPU 60 determines start timing of various processing and the like. For example, the CPU 60 refers to the timer 68 to determine when to start operation of a PRN code generator of the synchronization holding unit 50 based on the phase of the PRN code acquired by the synchronization acquisition unit 40.

The memory 70 includes a RAM (Random Access Memory), a ROM (Read-Only Memory), and the like, and has functions as a work area of the CPU 60, a memory unit of programs, a memory unit of the navigation message, and the like. In the memory 70, the RAM is used for the work area where the CPU 60 or the like carries out various processing.

The RAM may also be used for buffering input various data, and for holding the ephemeris and the almanac which are the orbital information of the GPS satellite obtained from the synchronization holding unit 50, intermediate data generated in the process of calculation or calculated result data, and the like. Further, in the memory 70, the ROM is used as means for storing various programs, fixed data, and the like. Furthermore, in the memory 70, a nonvolatile memory may be used as means for storing the ephemeris and the almanac as the orbital information of the GPS satellite, position information of positioned results or an error amount of a TCXO 1, and the like while the power of the GPS module 10 is switched off.

Note that, among the configuration of the GPS module 10 shown in FIG. 1, each block other than the XO 72, the TCXO 74, the antenna 12, and the BPF 24 can be implemented into an integrated circuit which is made of one chip.

Figure 2:
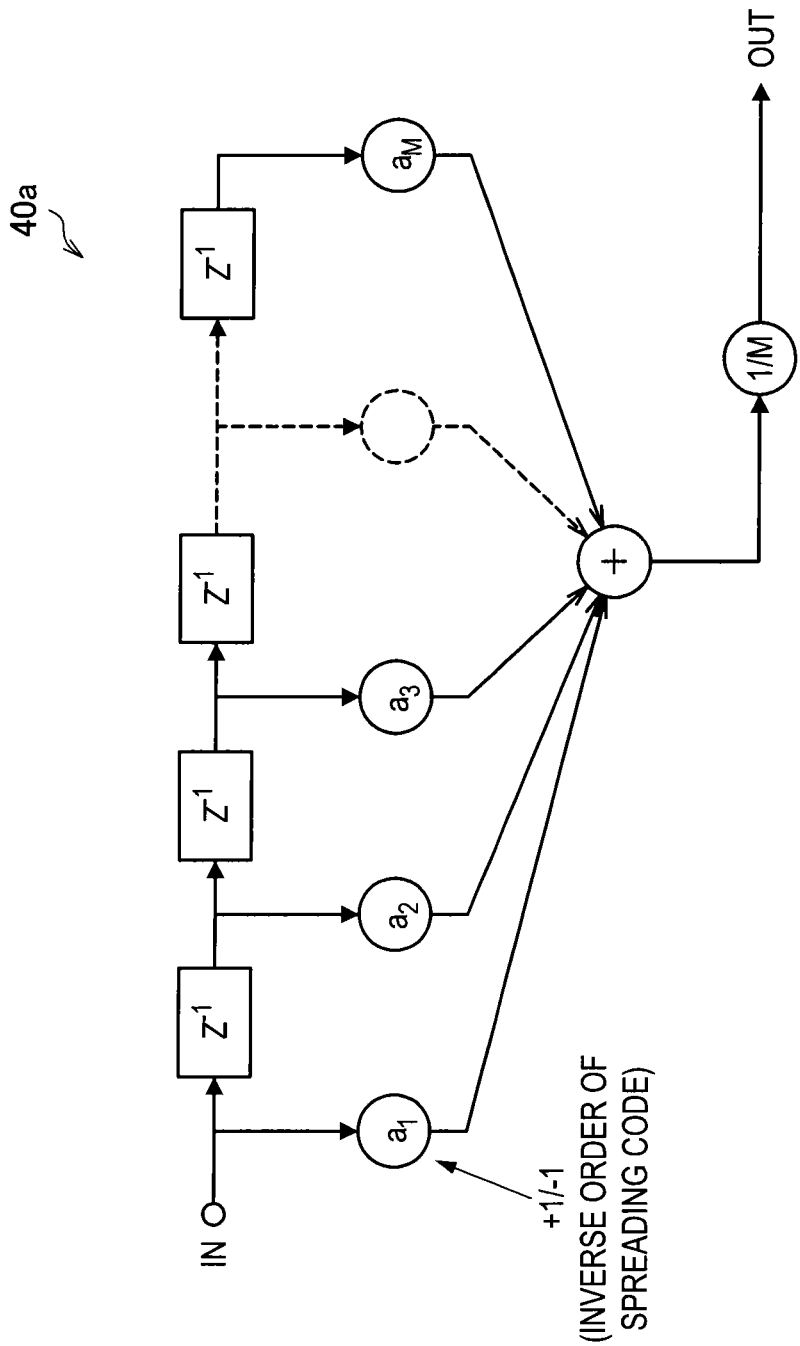
FIG. 2 is a block diagram showing an example of a more specific configuration of a synchronization acquisition unit of FIG. 1.

Note that, the synchronization acquisition unit 40 described above uses, for example, a matched filter in order to synchronously acquiring a spread code at a high speed. To be more specific, the synchronization acquisition unit 40 may use, for example, so-called "transversal filter" 40*a* shown in FIG. 2 as the matched filter. Alternatively, the synchronization acquisition unit 40 may use, for example, a digital matched filter 40*b* which uses fast Fourier transform (FFT) shown in FIG. 3, as the matched filter.

Figure 3:
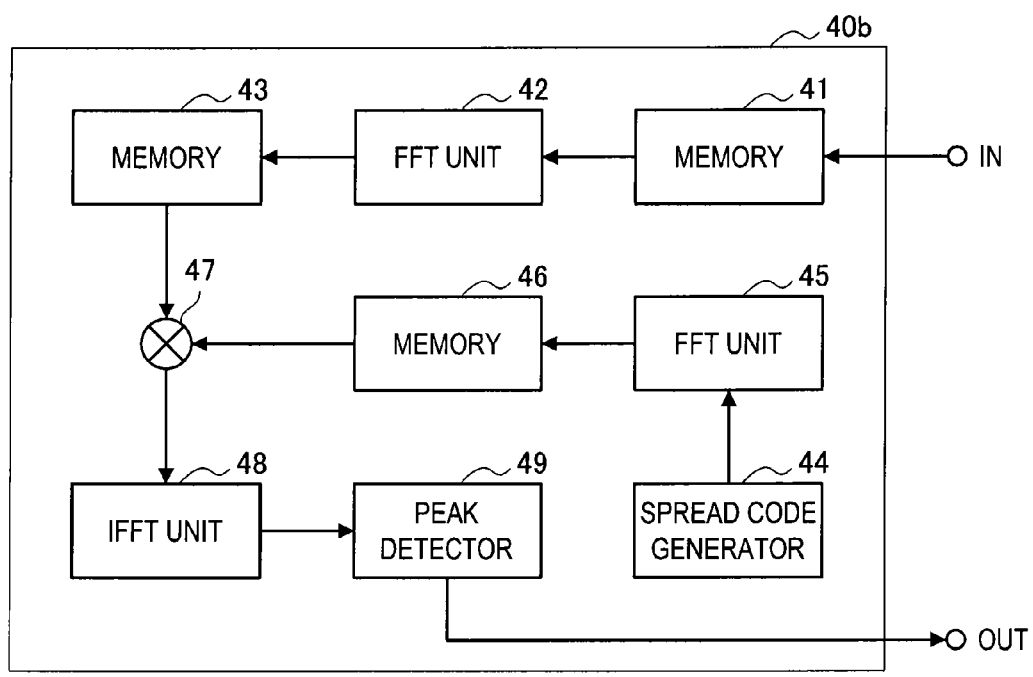
FIG. 3 is a block diagram showing another example of the more specific configuration of the synchronization acquisition unit of FIG. 1.

Referring to FIG. 3, for example, the digital matched filter 40*b* includes a memory 41, an FFT unit 42, a memory 43, a spread code generator 44, an FFT unit 45, a memory 46, a multiplier 47, an IFFT (Inversed Fast Fourier Transform) unit 48, and a peak detector 49.

The memory 41 buffers an IF signal sampled by the ADC 36 of the frequency conversion unit 20. The FFT unit 42 reads the IF signal buffered in the memory 41 to carry out fast Fourier transform. The memory 43 buffers a frequency-domain signal converted from the IF signal in the time-domain by the fast Fourier transform in the FFT unit 42.

Meanwhile, the spread code generator 44 generates a spread code which is identical to a spread code of an RF signal from the GPS satellite. The FFT unit 45 carries out fast Fourier transform of the spread code generated by the spread code generator 44. The memory 46 buffers the spread code in the frequency-domain converted from the spread code in the time-domain by the fast Fourier transform in the FFT unit 45.

The multiplier 47 multiplies the frequency-domain signal buffered in the memory 43 and the spread code in the frequency-domain buffered in the memory 46. The IFFT unit 48 carries out inverse fast Fourier transform of the multiplied frequency-domain signal output from the multiplier 47. Accordingly, a correlation signal in the time-domain between the spread code of the RF signal from the GPS satellite and the spread code generated by the spread code generator 44 is obtained. Then, the peak detector 49 detects a peak of the correlation signal output from the IFFT 48.

The digital matched filter 40*b* can be realized as software which executes processing of each part of the FFT units 42 and 45, the spread code generator 44, the multiplier 47, the IFFT unit 48, and the peak detector 49 by using a DSP (Digital Signal Processor).

Figure 4:
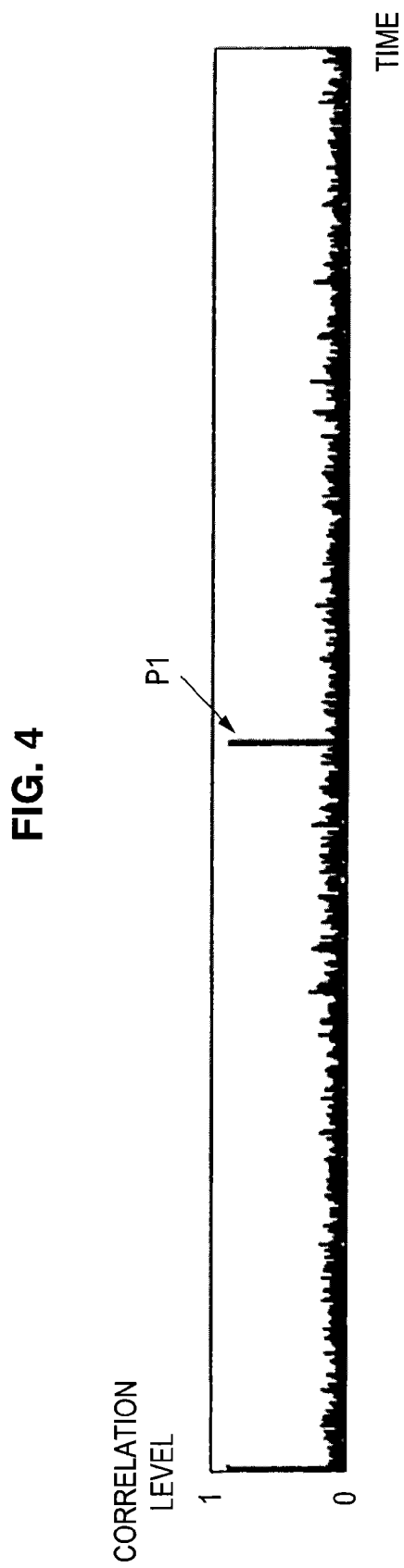
FIG. 4 is an illustration showing an example of a peak of correlation signals output from a digital matched filter.

FIG. 4 is an illustration showing an example of a peak of the correlation signal acquired by the above-described digital matched filters 40*a* or 40*b*. Referring to FIG. 4, a peak P1 has been detected, which has a protruding correlation level among the output waves of the correlation signal of one cycle. The position of the peak P1 on the time axis corresponds to the head of the spread code. That is, by detecting such peak P1, the synchronization acquisition unit 40 is capable of detecting the synchronization of the signal received from the GPS satellite (that is, detecting a phase of the spread code).

[1-2. An Outline of Synchronization Reestablishment]

Figure 5:
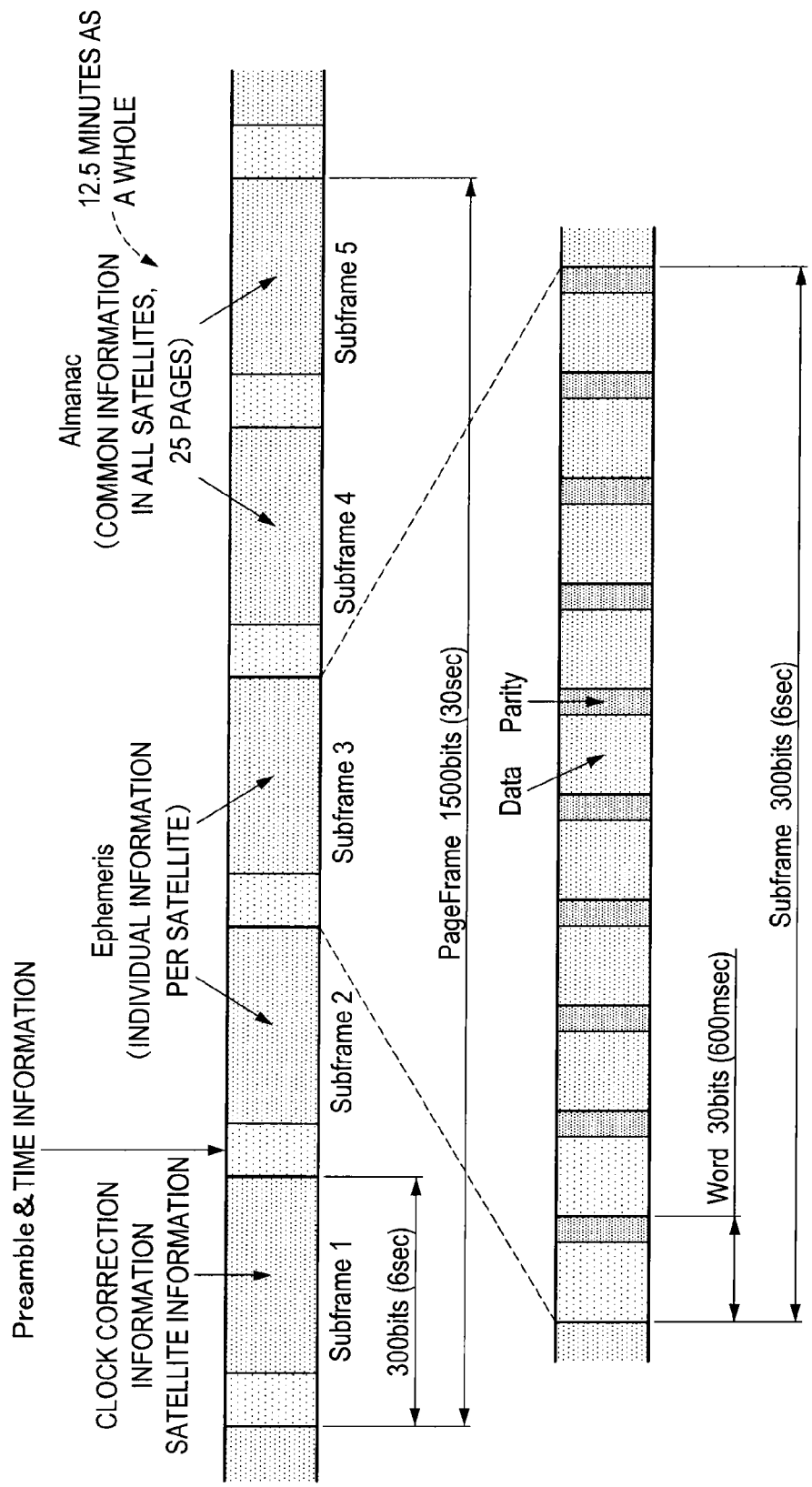
FIG. 5 is an illustration showing a data structure of the ephemeris and the almanac which are orbital information of a satellite.

Next, an outline of synchronization reestablishment by the GPS module 10 according to the present embodiment will be described. FIG. 5 is an illustration showing a data structure of the ephemeris and the almanac which are orbital information of the satellite. From the GPS satellite, a data rate of 50 bps, one frame is formed of five sub-frames, the first sub-frame includes clock correction information and satellite information, the second and third sub-frames include the ephemeris which is the orbital information individually transmitted from the satellite, and the fourth and fifth sub-frames include the almanac which is the orbital information commonly transmitted from all of the satellites.

Further, one sub-frame stores a preamble and data, and includes 10 sets of data of 30 bits.

Figure 6:
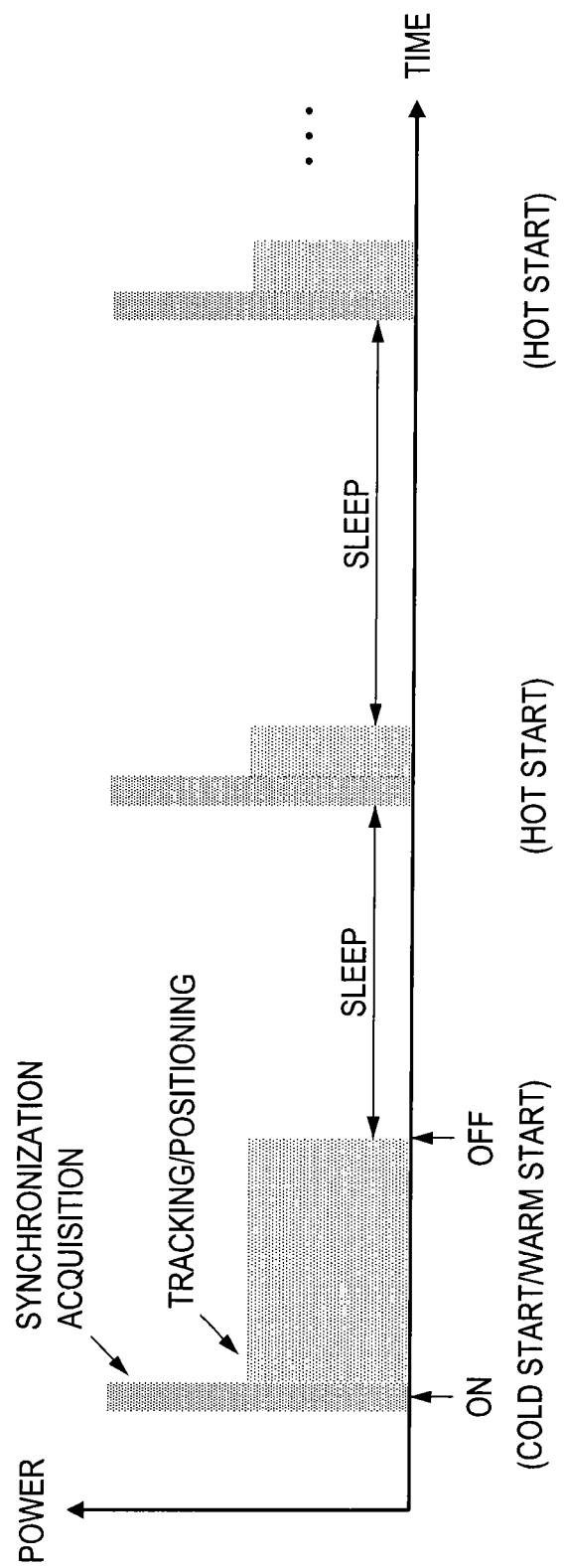
FIG. 6 is an illustration showing conception of intermittent operation by the hot start.

FIG. 6 is an illustration showing a concept of intermittent operation by the hot start. As described above, in the method of intermittent operation in which a normal initial set-up of a GPS receiver is carried out for reestablishing the synchronization, it is typical, as shown in FIG. 6, to transfer to the intermittent operation after establishing initial positioning by the cold start or the warm start, then to carry out the hot start by which the positioning can be performed in a short time. In this method, a synchronization acquisition unit with respect to a received signal of the satellite (for example, the synchronization acquisition unit 40 of FIG. 1) operates in the GPS receiver. Since the synchronization acquisition unit has a large processing load, and there are many cases of consuming more power than a synchronization holding unit (for example, the synchronization holding unit 50 of FIG. 1), it is inconvenient when the battery is defined by the peak power rather than by the average power.

The present embodiment reduces the average power and the peak power of the GPS module by reestablishing the synchronization by the synchronization holding unit 50 without using the synchronization acquisition unit 40. At this time, only a part inside the synchronization holding unit 50 operates rather than all of the parts operate, whereby pseudo synchronization of a satellite signal is held in a sleep period.

Figure 7:
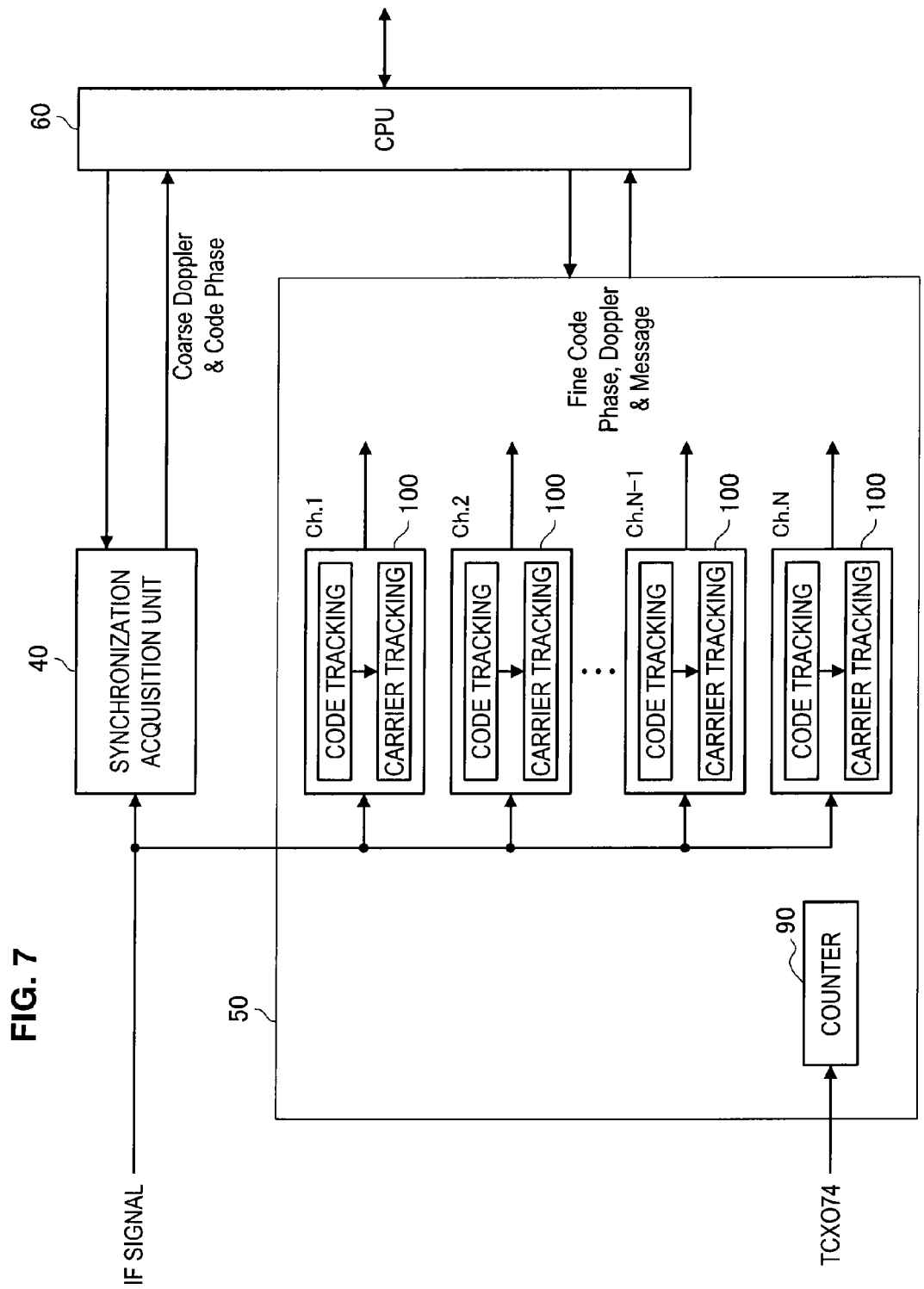
FIG. 7 is an illustration showing a configuration of a synchronization holding unit 50 included in the GPS module 10 shown in FIG. 1.

FIG. 7 is an illustration showing a configuration of the synchronization holding unit 50 included in the GPS module 10 shown in FIG. 1. As shown in FIG. 7, the synchronization holding unit 50 includes a counter 90 which counts based on a clock from the TCXO 74, and a channel circuit 100 which is provided to each GPS satellite in a corresponding manner, and synchronously holds the GPS satellite. The channel circuit 100 includes a code tracking loop which synchronizes codes and a carrier tracking loop which synchronizes carriers. In this way, by providing a plurality of the channel circuits 100, the synchronization holding unit 50 is capable of synchronously holding a plurality of the GPS satellites in a parallel manner.

Figure 8:
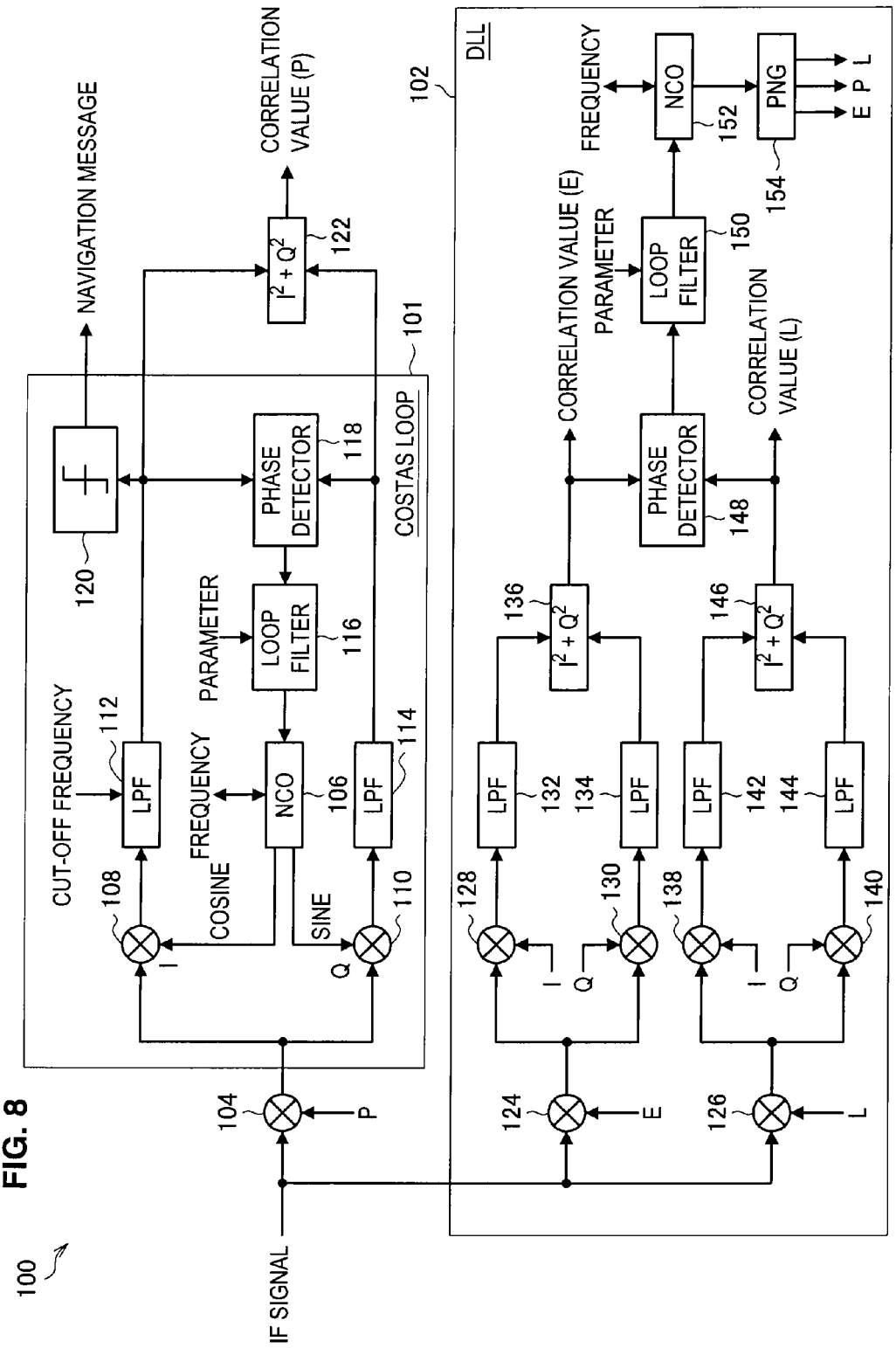
FIG. 8 is an illustration showing a configuration of a channel circuit 100 shown in FIG. 7.

FIG. 8 is an illustration showing a configuration of the channel circuit 100 shown in FIG. 7. As shown in FIG. 8, the channel circuit 100 includes a Costas loop 101 and a DLL 102.

To the Costas loop 101, with respect to an IF signal corresponding to the IF signal D14 described above, a signal is input, the signal resulting from a spread code (Prompt in FIG. 8) being multiplied by a multiplier 104, the spread code having a phase P (Prompt) and being generated by a spread code generator (PN Generator, hereinafter PNG) 154 described later. Meanwhile, the IF signal corresponding to the IF signal D14 obtained by the antenna 12 and the frequency conversion unit 20 described above is input to the DLL 102 of the channel circuit 100.

In the Costas loop 101, with respect to the input signal, a cosine component is multiplied by a multiplier 108 from among reproduced carriers produced by an NCO (Numeric Controlled Oscillator) 106. Meanwhile, with respect to the input signal, a sine component is multiplied by a multiplier 110 from among the reproduced carrier produced by the NCO 106. In the Costas loop 101, a predetermined frequency band component is transmitted through an LPF 112 from among the signals having the same phase obtained by the multiplier 108, and the transmitted signal is provided to a phase detector 118, a binarization circuit 120, and a sum of squares calculation circuit 122. Meanwhile, in the Costas loop 101, a predetermined frequency band component is transmitted through an LPF 114 from among the signals of an orthogonal component obtained by a multiplier 110, and the transmitted signal is provided to the phase detector 118 and the sum of squares calculation circuit 122. In the Costas loop 101, phase information detected by the phase detector 118 based on the signals output from each of the LPFs 112 and 114 is provided to the NCO 106 via a loop filter 116. In the Costas loop 101, the signals output from each of the LPFs 112 and 114 are provided to the sum of squares calculation circuit 122, and the sum of squares ($I^2+Q^2$) calculated by the sum of squares calculation circuit 122 is output as a correlation value (P) regarding the spread code having the phase P. Further, in the Costas loop 101, the signal output from the LPF 112 is provided to the binarization circuit 120, and the information obtained by binatization is output as a navigation message.

Meanwhile, in the DLL 102, with respect to the input IF signal, a spread code (Early in FIG. 8) E (Early) having a phase advancing from P is multiplied by a multiplier 124, the spread code being generated by the PNG 154. Also, with respect to the input IF signal, a spread code (Late in FIG. 8) L (Late) having a phase delaying from P is multiplied by a multiplier 126, the spread code being generated by the PNG 154. In the DLL 102, with respect to the signal obtained by the multiplier 124, a cosine component is multiplied by a multiplier 128 from among reproduced carriers produced by the NCO 106 of the Costas loop 101. Also, with respect to the signal obtained by the multiplier 124, a sine component is multiplied by a multiplier 130 from among the reproduced carriers produced by the NCO 106. Then, in the DLL 102, a predetermined frequency band component is transmitted through an LPF 132 from among the signals having the same phase component obtained by the multiplier 128, and the transmitted signal is provided to a sum of squares calculation circuit 136. Meanwhile, in the DLL 102, a predetermined frequency band component is transmitted through an LPF 134 from among the signals of the orthogonal component obtained by the multiplier 130, and the transmitted signal is provided to the sum of squares calculation circuit 136. Also, in the DLL 102, a cosine component is multiplied by a multiplier 138 from among the reproduced carriers produced by the NCO 106 of the Costas loop 101 with respect to the signal obtained by the multiplier 126. Also, a sine component is multiplied by a multiplier 140 from among the reproduced carriers produced by the NCO 106 with respect to the signal obtained by the multiplier 126. Then, in the DLL 102, a predetermined frequency band component is transmitted through an LPF 142 from among the signals having the same phase obtained by the multiplier 138, and the transmitted signal is provided to a sum of squares calculation circuit 146. Meanwhile, in the DLL 102, a predetermined frequency band component is transmitted through an LPF 144 from among the signals of an orthogonal component obtained by the multiplier 140, and the transmitted signal is provided to the sum of squares calculation circuit 146.

In the DLL 102, the signals output from each of the sum of squares calculation circuits 136 and 146 are provided to a phase detector 148, and phase information detected by the phase detector 148 based on the signals is provided to the NCO 152 via a loop filter 150. Further, spread codes of each phase E, P, and L are generated by the PNG 154 based on the signals having a predetermined frequency produced by the NCO 152. Further, in the DLL 102, the sum of squares ($I^2+Q^2$) calculated by the sum of squares calculation circuit 136 is output as a correlation value (E) regarding the spread code having the phase E. Also, in the DLL 102, the sum of squares ($I^2+Q^2$) calculated by the sum of squares calculation circuit 146 is output as a correlation value (L) regarding the spread code having the phase L.

Next, intermittent synchronization holding by the synchronization holding unit 50 having such configuration will be described in detail.

In the present embodiment, by causing the spreading code generation unit including the NCO 152 and the PNG 154, and the counter 90 of the synchronization holding unit 50 to operate, and causing the operation of the others to stop, pseudo synchronization of a satellite signal is held in the sleep period. Accordingly, the GPS module 10 according to the present embodiment is capable of restoring the synchronization after returning from the sleep condition in an exceedingly short time, and of positioning in a short time without causing the synchronization acquisition unit 40 to operate, whereby the average power and the peak power consumption can be lowered.

In this method, since a GPS reception oscillator (normally, the TCXO 74) operates even in the sleep condition, the power consumption in the sleep condition is larger than that of a method using an RTC. However, in recent years, the power consumption by the TCXO has been decreasing, and therefore, stable semi-continuous positioning with low power is possible when positioning is required with a certain degree of frequency instead of continuous positioning.

Figure 9:
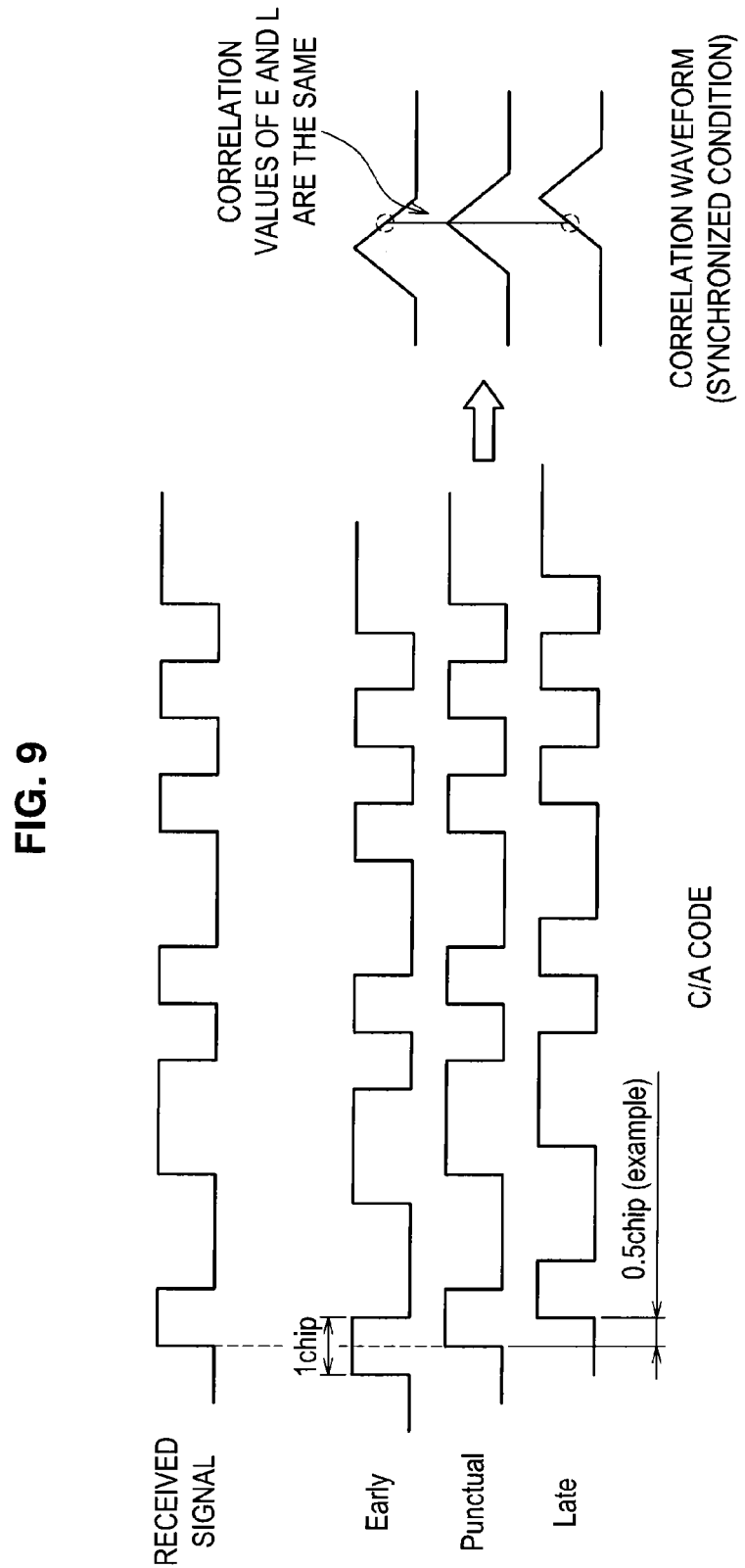
FIG. 9 is an illustration showing synchronization of a spread code of a received signal and a phase of a spreading code generation unit being held by control of a DLL.

In a condition where positioning is being in operation by receiving a signal from the GPS satellite, as shown in FIG. 9, the synchronization of the spread code of the received signal and the phase of the spreading code generation unit including the NCO 152 and the PNG 154 shown in FIG. 8 are held by control of the DLL 102. However, when the GPS module 10 transfers to the sleep condition, and causes the synchronization holding unit 50 to stop completely, the synchronization cannot be held. To instantly resynchronize after returning from the sleep condition, it is necessary to know the spreading code phase of within an error of 1 chip (about 1 μs). However, since the information of the spreading code phase is lost in the sleep period, resynchronization cannot be performed.

Therefore, according to the present embodiment, in order to move forward the spreading code phase during the sleep, only the spreading code generation unit and the counter 90 in the synchronization holding unit 50 are caused to operate during the sleep. The ratio of the power consumption by the spreading code generation unit and the counter 90 to the power consumption by the synchronization holding unit 50 as a whole is minute, which can greatly contribute to power saving.

As described above, the synchronization holding unit 50 includes the counter 90 which counts higher-resolution time than the RTC 64. By the counter 90, the synchronization holding unit 50 can specify the timing of the received signal from the satellite as long as the synchronization is established, thereby carrying out the positioning calculation using the high-resolution time of the measured timing. In the case of GPS, since the chip rate of the spreading code of the satellite is 1.023 MHz, the NCO can change the frequency around 1.023 MHz, so that the phase of the spreading code can be caused to advance or delay by this frequency setting.

It is known that the chip rate (fc Hz) of the spreading code of the received signal measured based on the GPS reception oscillator and a shift ($\Delta p$ [chip], 1 [chip]=1/1.023 [µsec]) of a phase through time with respect to the chip rate of 1.023 MHz are proportional to a shift ($\Delta f$ [Hz]) of a carrier frequency of the received signal measured based on the GPS reception oscillator from a nominal value of 1575.42 [MHz] and an elapsed time (t [sec]), and there is a following relationship:

$$fc=1.023 \times 10^6 + \Delta f/1540 [\text{Hz}] \tag{1}$$

$$\Delta p = -\Delta f/1540 \cdot t \tag{2}$$

Figure 10:
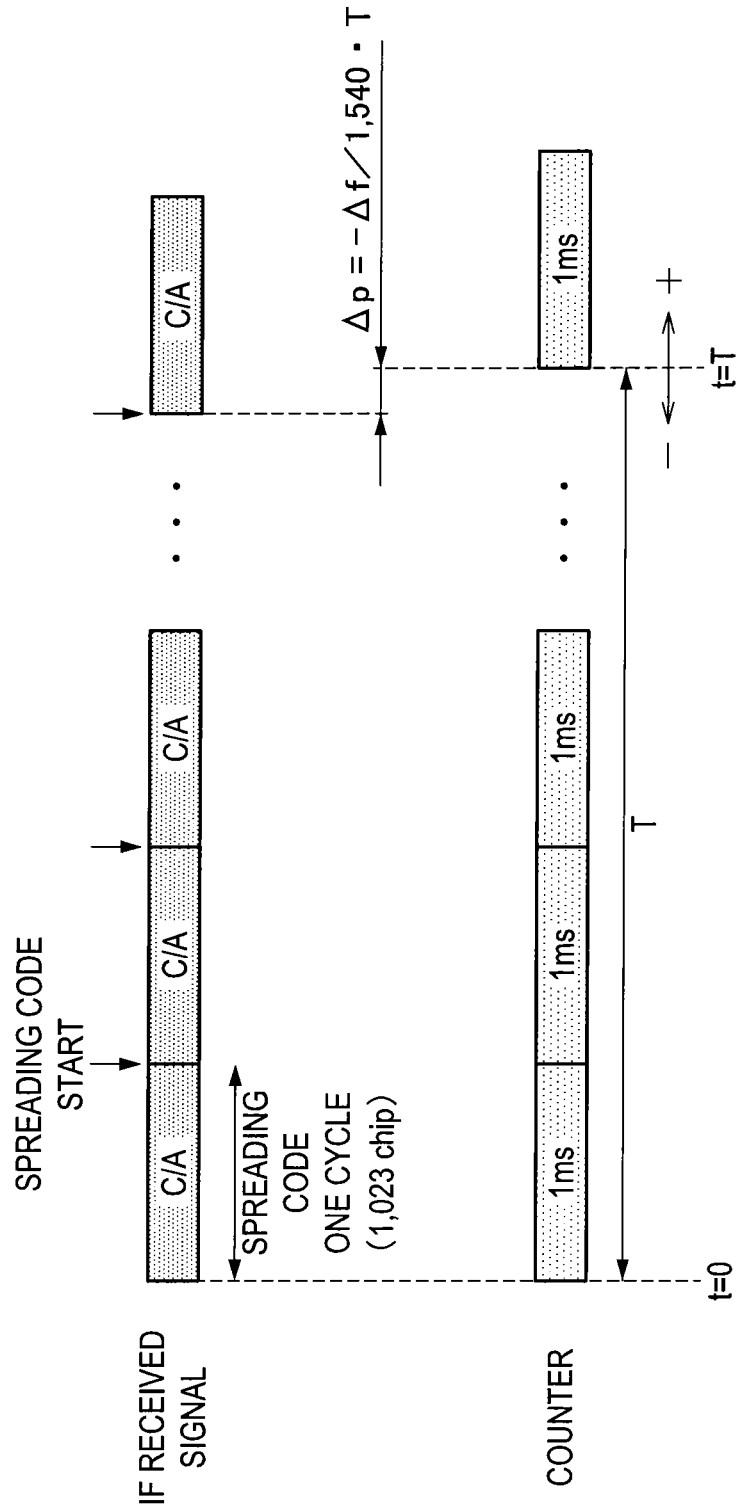
FIG. 10 is an illustration showing a relationship between a received signal and elapsed time.

FIG. 10 is an illustration showing a relationship between the received signal and the elapsed time. $\Delta f$ can be detected for each satellite with a carrier tracking loop for synchronizing carriers. The carrier frequency of the received signal differs from satellite to satellite due to difference of a Doppler shift amount, and thus, the shift of the spreading code phase also differs from satellite to satellite.

Figure 11:
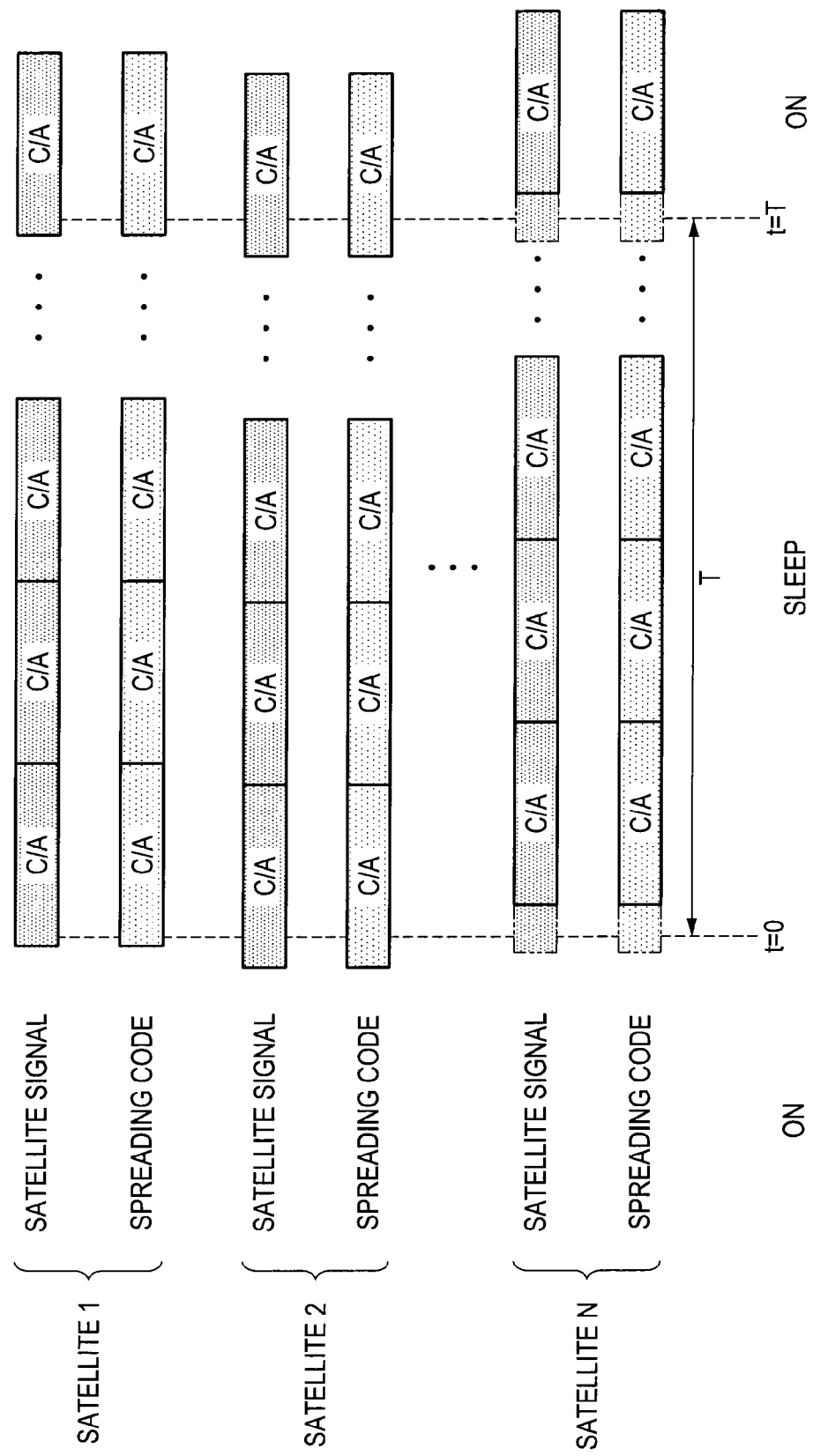
FIG. 11 is an illustration showing an example of properly setting a frequency of an NCO 152 which determines a chip rate of a spreading code in accordance with a Doppler shift amount per satellite.

However, by causing the frequency of the NCO 152 which determines the chip rate of the spreading code to accord with the Doppler shift amount per satellite, and to properly set by using the relationship of the above formula (1), the elements other than the spreading code generation unit and the counter 90 of the synchronization holding unit 50 are caused to stop. Accordingly, the pseudo synchronization can be held with a small phase error even in the sleep condition in which the synchronization is not held by control of the DLL 102. FIG. 11 is an illustration showing an example of properly setting a frequency of the NCO 152 which determines the chip rate of the spreading code in accordance with the Doppler shift amount per satellite. When the synchronization holding unit as a whole returns from the sleep condition with a small phase error, the phase error can be back to in the vicinity of 0 (zero) by control of the synchronization holding unit 50, whereby the synchronization can be instantly reestablished.

As described above, by causing only the spreading code generation unit including the NCO 152 and the PNG 154, and the counter 90 to operate in the sleep condition of the GPS module 10, the intermittent operation becomes possible in which the pseudo synchronization is held in the sleep condition and the synchronization is instantly reestablished after returning from the sleep.

In the sleep condition of the GPS module 10, since it is not necessary to receive a signal from the GPS satellite or to carry out the positioning calculation of a current value, the operation of the frequency conversion unit 20 other than the spreading code generation unit and the counter 90 of the synchronization holding unit 50, the synchronization acquisition unit 40, the CPU 60, and the memory 70 other than the memory for backup can stop. By causing the operation to stop in this way, the power consumption of the GPS module 10 during the sleep would be nearly by the TCXO 74 which is the GPS reception oscillator, and the spreading code generation unit and the counter 90 of the synchronization holding unit 50. The memory for backup is used for holding position information and the like of before the sleep. Note that, when a nonvolatile memory such as a flash memory is available, the backup memory by an SRAM is not necessary.

To hold the pseudo synchronization in the sleep condition, as described above, it is necessary to set the NCO 152 of the spreading code generation unit to be a proper value per satellite. As the simplest way, there is a way to hold the value of the NCO 152 immediately before the sleep condition as a value in the sleep condition. The frequency of the NCO 152 of the spreading code generation unit in the synchronization condition can be ideally equal to the chip rate of the above formula (1) by control of the DLL 102 of the channel circuit 100. In the actual operation, because the frequency of the NCO 152 and the control of the DLL 102 are in a discrete manner, and because of fluctuation due to noise of the received signal, the frequency of the NCO 152 immediately before the sleep is not necessarily the most appropriate. Therefore, an average value of the frequencies of the NCO 152 is calculated for a given length of time (for example, for one second) immediately before the sleep, and the calculated value can be set as the frequency of the NCO 152 in the sleep condition.

Figure 12:
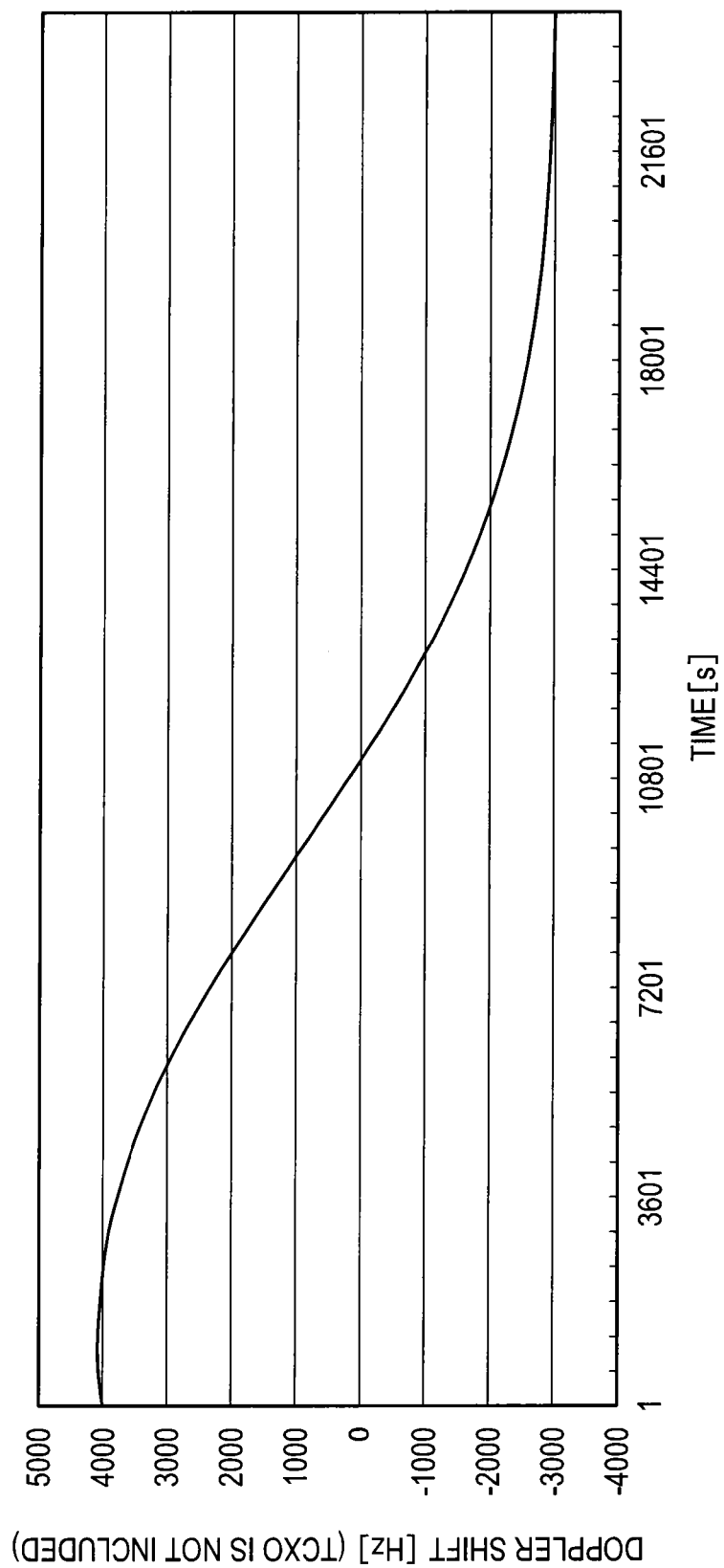
FIG. 12 is an illustration of a graph showing an example of change of Doppler shift of the satellite.

The way of setting the frequency of the NCO 152 of the spreading code generation unit immediately before the sleep as the NCO in the sleep condition is the simplest. However, Doppler shift of the satellite is not a fixed value and changes through time. Therefore, the chip rate changes. FIG. 12 is an illustration of a graph showing an example of change of Doppler shift of the satellite. The graph shown in FIG. 12 shows the time on the horizontal axis, and Doppler shift on the vertical axis. It can be seen that Doppler shift of the satellite is not a fixed value, and changes temporally. Therefore, the way of setting the frequency of the NCO 152 of the spreading code generation unit immediately before the sleep as the NCO in the sleep condition is suitable when an interval of intermittent time is short. However, the time for continuously holding the pseudo synchronization cannot be made longer. The higher the time rate of the change of Doppler shift, the shorter the time for continuously holding the pseudo synchronization, and there is a case where the time for continuously holding the pseudo synchronization does not last for 30 seconds even in an ideal condition where no fluctuation of the oscillator occurs. To make the time for continuously holding the pseudo synchronization longer, the frequency of the NCO 152 to be set may be just corrected in consideration of the change of Doppler shift.

Considering the temporal change of Doppler shift of the satellite shown in FIG. 12, where fc, $\Delta f$, and $\Delta p$ are functions of time t, the above formulas (1) and (2) are:

$$fc(t) = 1.023 \times 10^6 + \Delta f(t)/1540 [\text{Hz}] \tag{3}$$

$$\Delta p(t) = -\int_0^t \Delta f(t)/1540 \cdot dt \tag{4}$$

"t=0" shows the time of a starting point, and when the intermittent time is on the order of some minutes, the change of Doppler shift shown in FIG. 12 can be approximated by the following liner expressions:

$$\Delta f(t) = \Delta f(0)(1 + a \cdot t) \tag{5}$$

$$\Delta p(t) = -\Delta f(0)/1540 \cdot t \cdot (1 + a/2\Delta f)(0) \cdot t) \tag{6}$$

Here, $\Delta f(0) = \Delta f(t=0)$, "a" shows an inclination of time change, that is, a differentiation value of a curved line like the one shown in FIG. 12. When a=0 in the formulas (5) and (6), the formulas (5) and (6) coincide with the formulas (1) and (2).

The way in which the frequency of the NCO 152 of the spreading code generation unit immediately before the sleep is set as the frequency of the NCO 152 in the sleep condition described above has a similar sense to having the following formula:

$$fc = 1.023 \times 10^6 + \Delta f)(0)/1540 \tag{7}$$

in the sleep condition with respect to the formulas (5) and (6), and the time change of Doppler shift in the sleep condition is not considered. Therefore, the phase of the spreading code is shifted by:

$$\Delta p(t) = -a/2 \cdot t^2/1540 \quad (8)$$

with respect to time t. For example, when t=30 sec and a=1 Hz/sec, since the shift is 0.29 chips, the shift is within an allowable range of correction by control of the DLL 102 after returning from the sleep condition. However, when t=60 sec, the DLL 102 cannot correct the shift which causes after returning from the sleep condition since the frequency is shifted by 1.17 chips. Therefore, the resynchronization of the received signal from the satellite cannot be instantly performed.

However, the GPS module 10 has an actual measured value of $\Delta f(0)$ before entering the sleep condition, and is capable of calculating $\Delta f$ and $a=(\Delta f(T)-\Delta f(0))/T$ of after t=T seconds by using the ephemeris and the measured result. Therefore, by estimating the phase shift of the spreading code of after t=T seconds due to Doppler shift by the above formula (8), and by adding a correction value to the formula (7) based on an estimated value, the phase shift of the spreading code of after t=T seconds is corrected. That is, when it is desired to adjust the phase of the spreading code to after T seconds, a value, which is calculated by adding a correction term to the formula (7), may be just set as the frequency of the NCO 152 of the spreading code generation unit in the sleep condition like the following formula:

$$fc = 1.023 \times 10^6 + \Delta f(0)/1540 \cdot (1 + a/2\Delta f(0) \cdot T) \quad (9)$$

Note that, the formula (9) can be modified like:

$$fc = 1.023 \times 10^6 + (\Delta f(0) + \Delta f(T))/2/1540 \quad (10)$$

Therefore, as can be seen, the formula (9) is equal to setting an average value $(\Delta f(0)+\Delta f(T))/2$ as the frequency of the NCO 152, which is an average value of the shifts of the carrier frequencies at t=0 and t=T, instead of setting the frequency of the NCO 152 of the spreading code generation unit immediately before the sleep as the frequency in the sleep condition.

In a case where the GPS module 10 can determine the sleep time, by carrying out the correction of the formula (9) described above with T as the sleep time, the shift of the spreading code phase can be sufficiently smaller than 1 chip when initiating from the sleep condition after T seconds, whereby the GPS module 10 becomes capable of instantly establishing the resynchronization by control of the DLL 102 of the channel circuit 100. Note that the returning from the sleep condition is not necessarily exactly after T seconds as long as time shift from T seconds is substantially small.

As a correction method with respect to the change of Doppler shift, a method of carrier correction of Doppler shift has been described with reference to the linear approximation like the formula (5). However, it may be obvious that approximation by quadratic equation or more is also possible.

Note that, in the actual use, since a receiver having a built-in GPS module 10 travels, a shift of a spreading code phase due to Doppler shift of the traveling is also added. The actual measured value $\Delta f(0)$ at t=0 includes a Doppler shift amount of the traveling of the GPS module 10, and the traveling speed and the acceleration at t=0 of the GPS module 10 can be calculated. Therefore, for example, by linearly approximating Doppler shift of the traveling of the GPS module 10 and by adding the approximated amount to $\Delta f(T)$ of the formula (9) or (10), the shift of the spreading code phase due to the traveling of the GPS module 10 can be corrected as long as the approximation is established.

By using the above correction, the synchronization holding unit 50 can establish resynchronization by control of the DLL 102 of the channel circuit 100. When the GPS module 10 alone can determine the time to enter the sleep and the time to return from the sleep, the above correction calculation is carried out before entering the sleep condition, and the calculated result can be used as the frequency of the NCO 152 of the spreading code generation unit in the sleep condition.

Figure 13:
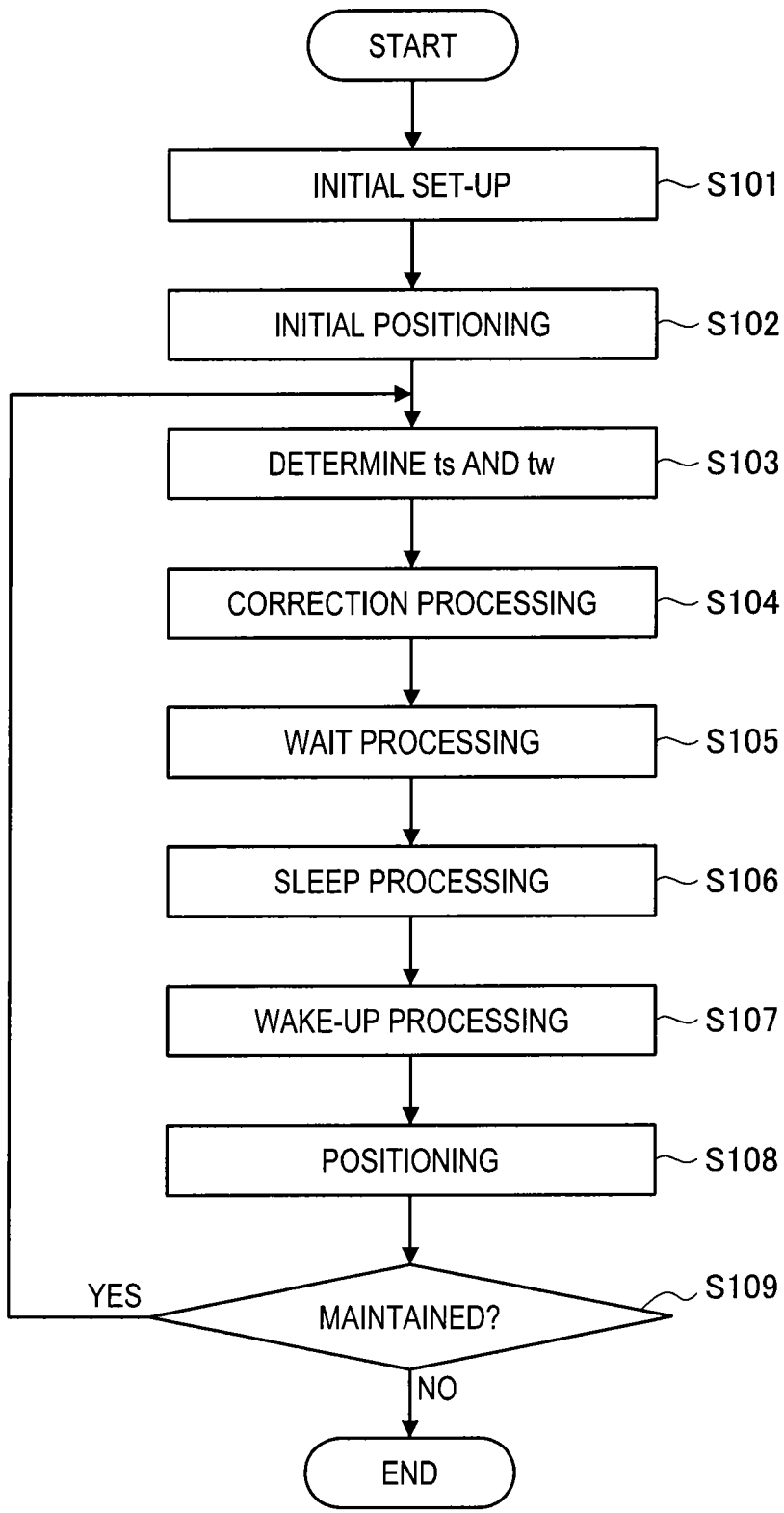
FIG. 13 is a flow chart showing operation of the GPS module 10.

Next, operation of the GPS module 10 will be described. FIG. 13 is a flow chart showing operation of the GPS module 10. Hereinafter, the operation of the GPS module 10 will be described with reference to FIG. 13.

First, the GPS module 10 is initiated, and each part of the GPS module 10 shown in FIG. 1 is energized (step S101). Next, the GPS module 10 receives a radio wave from the GPS satellite to carry out initial positioning (step S102). The initial set-up and the initial positioning by the GPS module 10 correspond to the first synchronization acquisition and tracking/positioning period shown in FIG. 6. By the initial positioning at step S102, the GPS module 10 acquires the ephemeris.

After executing the initial positioning at step S102 described above, the GPS module 10 determines the time to enter the sleep ts and the time to return from the sleep tw (step S103). Any value can be set as the time to enter the sleep ts and the time to return from the sleep tw in accordance with the operation environment of the GPS module 10 (a device in which the GPS module 10 is built in, the operating condition of the device, or the like).

After the time to enter the sleep ts and the time to return from the sleep tw are determined at step S103 described above, the GPS module 10 executes correction processing by using the determined times (step S104). The correction processing at step S104 is for calculating the frequency of the NCO 152 at the time to return from the sleep tw, and the calculation is carried out by using the above formula (9). That is, the value obtained by subtracting the time to enter the sleep ts from the time to return from the sleep tw corresponds to T in the above formula (9). Therefore, by entering the value to the above formula (9), the value being obtained by subtracting the time to enter the sleep ts from the time to return from the sleep tw, the frequency of the NCO 152 at the time to return from the sleep tw can be calculated.

After the correction processing at step S104 is executed, the GPS module 10 executes wait processing for waiting until the time to enter the sleep ts (step S105). Then, when the time to enter the sleep ts comes, the GPS module 10 executes sleep processing for sleeping until the time to return from the sleep tw (step S106). The sleep processing causes only the spreading code generation unit including the NCO 152 and the PNG 154, and the counter 90 to operate, and causes the other configuration to stop.

When the counter 90 reaches the time to return from the sleep tw, the GPS module 10 executes wake-up processing for returning from the sleep condition (step S107). The wake-up processing is for causing the configuration stopped at step S106 to operate. By causing the configuration stopped at step S106 to operate, the GPS module 10 returns from the sleep condition.

After the wake-up processing is executed at step S107, the GPS module 10 executes positioning processing of the current value (step S108). The positioning processing at step S108 is carried out by using the frequency of the NCO 152 at the time to return from the sleep tw, which has been calculated at the correction processing executed at step S104. Consequently, the GPS module 10 can hold the pseudo synchronization even when the GPS module 10 is in the sleep condition, and can execute the positioning processing right after returning from the sleep condition.

After the positioning processing of the current value is executed at step S108, the GPS module 10 determines whether or not transition to the sleep condition is maintained (step S109). Whether or not transition to the sleep condition is maintained can be determined depending on the operation circumstance of the GPS module 10 (a device in which the GPS module 10 is built in, the operating condition of the device, or the like).

As a result of the determination at step S109, when the transition to sleep condition is maintained, the GPS module 10 returns to step S103, and determines the time to enter the sleep ts and the time to return from the sleep tw. On the other hand, as a result of the determination at step S109, when no transition to the sleep condition is performed, the GPS module 10 terminates the transition processing to the sleep condition.

As described above, the operation of the GPS module 10 has been described with reference to FIG. 13. By operating in this way, the GPS module 10 can hold the pseudo synchronization even in the sleep condition, and can execute the positioning processing right after returning from the sleep condition.

When the time to enter the sleep or the time to return from the sleep of the GPS module 10 is determined by an element outside the GPS reception function, for example, by a host CPU of a system which incorporates the GPS module 10, upon entering the sleep condition, the GPS reception function alone cannot learn the sleep time that elapses before the GPS module 10 initiates next. In that case, the system determines the time to enter the sleep and the time to return from the sleep, and communicates the information to the GPS module 10 in which the GPS module 10 is built in. The GPS module 10 in which the GPS module 10 is built in can perform the correction described above based on the communicated time information.

2. Description of a Device in which the GPS Module is Built in

Figure 14:
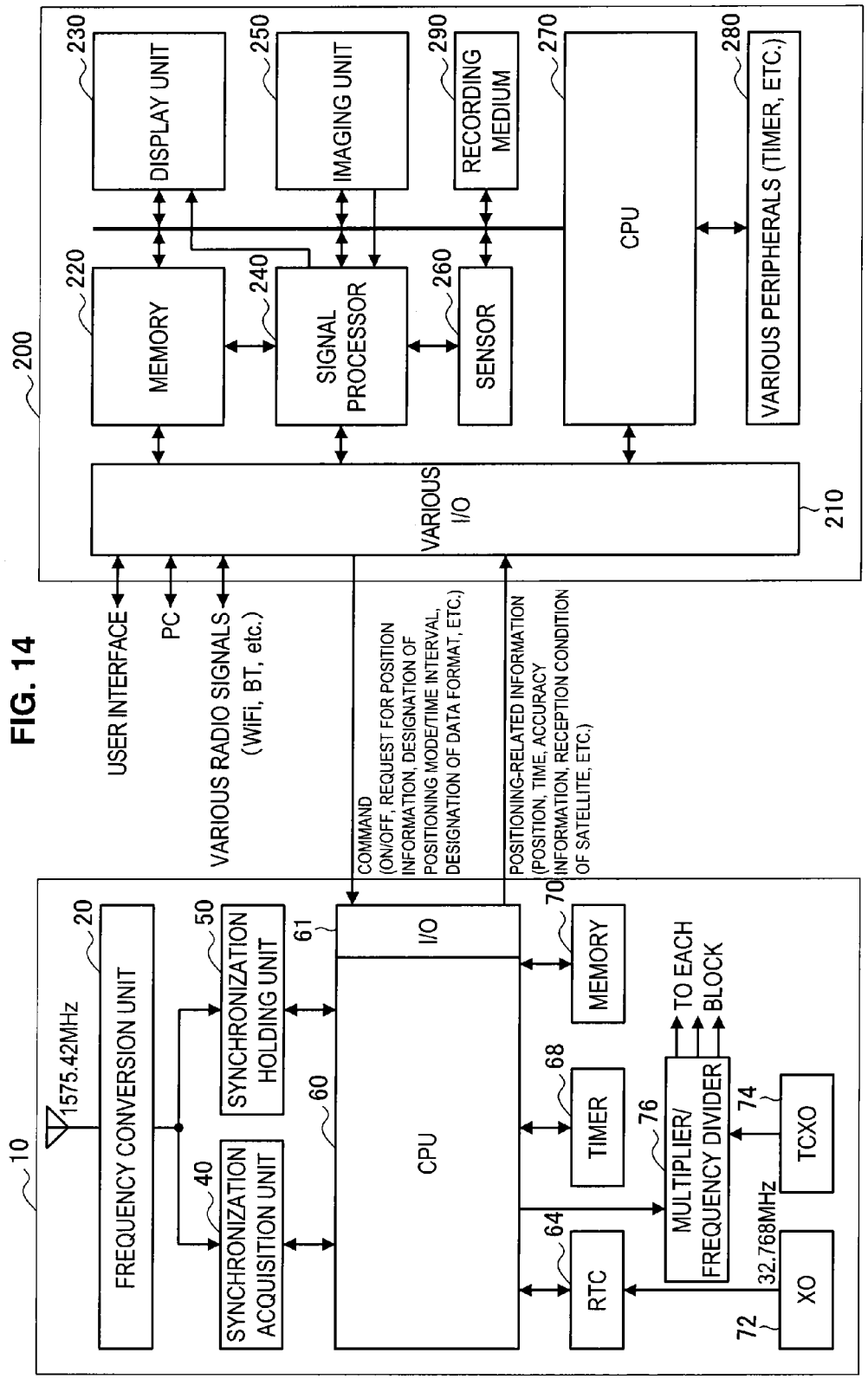
FIG. 14 is an illustration showing a configuration of a digital still camera 200 which transmits/receives information to/from the GPS module 10 according to an embodiment of the present disclosure.

Next, a configuration of a device in which the GPS module is built in will be described with reference to an example in which the GPS module 10 is built into a digital still camera. FIG. 14 is an illustration showing a configuration of a digital still camera 200 which transmits/receives information to/from the GPS module 10 according to an embodiment of the present disclosure.

As shown in FIG. 14, the digital still camera 200 which transmits/receives information to/from the GPS module 10 includes an I/O 210, a memory 220, a display unit 230, a signal processor 240, an imaging unit 250, a sensor 260, a CPU 270, various peripherals 280 such as a timer, and a recording medium 290.

The I/O 210 is an interface for transmitting/receiving contents of operation input by the user, information from an external GPS module 10, and other signals. The I/O 210 outputs a command to the GPS module 10, and inputs the information from the GPS module 10. Also, the I/O 210 receives an input from the user of the digital still camera 200, transmits/receives data to/from a personal computer, and transmits/receives a radio signal to/from various wireless communication means.

The signal processor 240 carries out predetermined signal processing with respect to an imaging signal output from the imaging unit 250, and outputs the processed image signal (image data) to the CPU 270 as digital video data of a base band. That is, the signal processor 240 samples, with respect to the imaging signal output from the imaging unit 250, only the signal having image information by a CDS (Correlated Double Sampling) circuit, and removes noises. Then, the signal processor 240 controls a gain by an AGC (Auto Gain Control) circuit and, converts the signal into a digital signal by an A/D (Analog/Digital) conversion circuit. Further, the signal processor 240 executes, with respect to the converted digital signal, signal detection processing to extract components of each color: R (red), G (green), and B (blue), and carries out processing such as γ correction or white balance correction. Finally, the signal is output to the CPU 270 as digital video data of the one base band.

Further, the signal processor 240 generates a video signal by which a captured image (so-called, through image) is displayed on the display unit 230 based on the imaging signal output from the imaging unit 250. As the display unit 230, a display element such as an LCD (Liquid Crystal Display) can be used.

The imaging unit 250 includes an optical component and an imaging element. The optical component includes a plurality of lenses (such as zoom lens and focus lens (not shown)) for concentrating light from an object to be captured, an iris (not shown), and the like, and the entered light from the object to be captured is provided to the imaging element via the lenses or the iris. The imaging element photoelectrically converts the entered light from the object to be captured via the optical component into an analog imaging signal (image signal), and outputs the converted analog imaging signal to the signal processor 240. Note that, as the imaging element, a CCD (Charge Coupled Device) sensor, a CMOS (Complementary Metal Oxide Semiconductor) sensor, or the like can be used.

The CPU 270 controls operation of each part of the digital still camera 200. Further, the various peripherals 280 include a timer and the like, and are used for various operation inside the digital still camera 200. Further, the memory 220 includes a ROM, a RAM, and the like, and stores various information or programs for operation of the digital still camera 200.

The recording medium 290 is a recording medium for storing information such as a moving image file based on recording control by the CPU 270. For example, the recording medium 290 stores digital video data output from the signal processor 240. Also, the recording medium 290 stores a moving image management file for managing the moving image file. Note that, the recording medium 290 can be built into the digital still camera 200, or can be removable from the digital still camera 200. Further, as the recording medium 290, various media can be used such as a semiconductor memory, an optical recording medium, a magnetic disc, and an HDD (Hard Disk Drive). Note that, examples of the optical recording medium include a recordable DVD (Digital Versatile Disc), a recordable CD (Compact Disc), a Blu-ray disc (registered trademark), and the like.

From the digital still camera 200 to the GPS module 10, commands are transmitted such as on/off of the GPS module 10, a request of position information, designation of a positioning mode/a time interval, and designation of a data format. On the other hand, from the GPS module 10 to the digital still camera 200, positioning-related information is transmitted such as a position, a time, accuracy information, and a reception condition of the satellite.

As described above, the configuration of the digital still camera 200 which transmits/receives information to/from the GPS module 10 according to the present disclosure has been described with reference to FIG. 14. Next, operation of the GPS module 10 and the digital still camera 200 will be described.

FIGS. 15A and 15B are flow charts showing the operation of the GPS module 10 and the digital still camera 200. FIGS. 15A and 15B show the operation of the CPU 270 of the digital still camera 200, the CPU 60 of the GPS module 10, and core parts of the GPS module 10 (the frequency conversion unit 20, the synchronization acquisition unit 40, and the synchronization holding unit 50). Hereinafter, the operation of the GPS module 10 and the digital still camera 200 will be described with reference to FIGS. 15A and 15B.

From the CPU 270 (system CPU) of FIG. 14 to the GPS module 10, a request for starting positioning is transmitted (step S201). Upon receiving the request for starting positioning from the CPU 270, the CPU 60 of the GPS module 10 (CPU of the GPS receiver) instructs the core parts of the GPS module 10 (the frequency conversion unit 20, the synchronization acquisition unit 40, and the synchronization holding unit 50) to perform an initial set-up (step S202). After instructing the core parts of the GPS module 10 to perform the initial set-up, the CPU 60 notifies the CPU 270 of completion of the preparation (step S203). Meanwhile, the core parts of the GPS module 10, upon receiving the instruction of the initial set-up from the CPU 60, start various initial set-ups (step S204).

Then, the CPU 270 (system CPU) of the digital still camera 200 instructs the GPS module 10 to perform intermittent positioning as well as designating a time interval of the intermittent positioning (step S205). Upon receiving the request for starting the positioning from the CPU 270, the CPU 60 of the GPS module 10 instructs the core parts of the GPS module 10 to start initial positioning (step S206). Upon receiving the instruction to start initial positioning, the core parts of the GPS module 10 receive a radio wave from the GPS satellite, and execute synchronization processing (step S207).

After executing the receiving processing/synchronization processing of the radio wave, the core parts of the GPS module 10 notify the CPU 60 of a pseudo distance, a time, and information of a reception condition of the radio wave (step S208). The CPU 60 executes positioning calculation based on the information notified by the core parts of the GPS module 10, and calculates a correction value for the correction processing (step S209). After executing the positioning calculation, the CPU 60 notifies the CPU 270 of the digital still camera 200 of position information, a time, accuracy information, and information of a receiving condition (step S210). The CPU 270 displays a position of a current value to the display unit 230 by using the information notified by the CPU 60 (step S211).

Then, the CPU 60 instructs the core parts of the GPS module 10 to execute correction processing using the correction value calculated at step S209 described above (step S212). Upon receiving the instruction of correction, the synchronization holding unit 50 which constitutes the core parts of the GPS module 10 executes the correction processing for setting a frequency of the NCO 152 (step S213).

After the synchronization holding unit 50 executes the correction processing for setting the frequency of the NCO 152, the CPU 60 instructs the core parts of the GPS module 10 to execute wait processing and sleep processing (step S214). Upon receiving the instruction from the CPU 60, the core parts of the GPS module 10 execute the wait processing and the sleep processing (step S215). Accordingly, in the core parts of the GPS module 10, only the spreading code generation unit and the counter 90 of the synchronization holding unit 50 are in operation.

The CPU 60 counts time based on the time interval notified by the CPU 270 of the digital still camera 200 at step S205 described above (step S216). Then, when a predetermined time comes, the CPU 60 instructs the core parts of the GPS module 10 to execute wake-up processing (step S217). Upon receiving the instruction from the CPU 60, the core parts of the GPS module 10 execute the wake-up processing, and receive a radio wave from the GPS satellite to execute the synchronization processing (step S218).

After executing the receiving processing/synchronization processing of the radio wave, the core parts of the GPS module 10 notify the CPU 60 of a pseudo distance, a time, and information of a reception condition of the radio wave (step S219). The CPU 60 executes positioning calculation based on the information notified by the core parts of the GPS module 10, and calculates a correction value for the correction processing (step S220). After executing the positioning calculation, the CPU 60 notifies the CPU 270 of the digital still camera 200 of position information, a time, accuracy information, and information of a reception condition (step S221). The CPU 270 displays a position of a current value to the display unit 230 by using the information notified by the CPU 60 (step S222).

Then, the CPU 60 instructs the core parts of the GPS module 10 to execute the correction processing using the correction value calculated at step S220 described above (step S223). Upon receiving the instruction of correction, the synchronization holding unit 50 which constitutes the core parts of the GPS module 10 executes the correction processing for setting the frequency of the NCO 152 (step S224).

After the synchronization holding unit 50 executes the correction processing for setting the frequency of the NCO 152, the CPU 60 instructs the core parts of the GPS module 10 to execute the wait processing and the sleep processing (step S225). Upon receiving the instruction from the CPU 60, the core parts of the GPS module 10 execute the wait processing and the sleep processing (step S226). Accordingly, in the core parts of the GPS module 10, only the spreading code generation unit and the counter 90 of the synchronization holding unit 50 are in operation.

Then, the CPU 60 and the core parts of the GPS module 10 execute, similar to steps S214 to S220 described above, the counting of the predetermined time, the wake-up processing, the signal reception processing/synchronization processing, and the positioning calculation of a current value/correction processing (steps S225 to S231). After executing the positioning calculation, the CPU 60 notifies the CPU 270 of the digital still camera 200 of position information, a time, accuracy information, information of a reception condition (step S232). The CPU 270 displays a position of a current value to the display unit 230 by using the information notified by the CPU 60 (step S233).

By repeatedly executing the intermittent operation described above, the GPS module 10 can reduce the average power and the peak power.

Then, according to the user's operation or the like, the CPU 270 of the digital still camera 200 notifies the CPU 60 of the GPS module 10 of a request for stopping the positioning (step S234). Upon receiving the notification, the CPU 60 instructs the core parts of the GPS module 10 to stop the positioning (step S235). The core parts of the GPS module 10 stop the operation in accordance with the instruction to stop the positioning from the CPU 60 (step S236). The CPU 60 notifies the CPU 270 of the digital still camera 200 of completion of the stop processing of the positioning of the GPS module 10 (step S237), and causes itself to transfer to a stand-by condition (step S238).

By causing the GPS module 10 and the digital still camera 200 to operate in this manner, the GPS module 10 executes the positioning intermittently. Then, in the GPS module 10, during the sleep, only the spreading code generation unit and the counter 90 of the synchronization holding unit 50 are in operation. Accordingly, the GPS module 10 can reduce the average power and the peak power.

As described above, the operation of the GPS module 10 and the digital still camera 200 has been described with reference to FIGS. 15A and 15B. Note that an example has been described in which the GPS module 10 is built into the digital still camera 200. However, the present disclosure is not limited to the example. Another embodiment can be adopted in which the GPS module 10 is provided outside the digital still camera 200, that is, in which the GPS module 10 is connected to the digital still camera 200, and transmission/reception of commands and information is performed between the digital still camera 200 and the GPS module 10.

3. Conclusion

As described above, an embodiment of the present disclosure has been described by taking the GPS module 10 as an example. By causing the spreading code generation unit including the NCO 152 and the PNG 154, and the counter 90 of the synchronization holding unit 50 to operate while causing the operation of the others to stop in the sleep period, the pseudo synchronization of the satellite signal can be held during the sleep period. By holding the pseudo synchronization of the satellite signal in the sleep period, the GPS module 10 can restore the synchronization in an extremely short time after returning from the sleep condition, and can carry out the positioning in a short time without causing the synchronization acquisition unit 40 to operate, whereby the intermittent operation for reducing the average and peak power consumption can be realized.

Further, the present disclosure is basically applicable to a GNSS receiver as well, other than the GPS receiver. That is, the embodiment of the present disclosure described above is applicable to a general spread-spectrum type wireless system.

Still further, in the embodiment described above, it is assumed that the counter 90 is included in the synchronization holding unit 50. However, the counter 90 is not necessarily included inside the synchronization holding unit 50, and might be provided outside the synchronization holding unit 50.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

10 GPS module
12 Antenna
20 Frequency conversion unit
40 Synchronization acquisition unit
50 Synchronization holding unit
60 CPU
64 RTC
68 Timer
70 Memory
72 XO
74 TCXO
76 Multiplier/frequency divider
90 counter
100 Channel circuit
101 Costas loop
102 DLL
152 NCO
154 PNG
200 Digital still camera
210 I/O
220 Memory
230 Display unit
240 Signal processor
250 Imaging unit
260 Sensor
270 CPU
280 Various peripherals
290 Recoding medium

The invention claimed is:

1. A receiving device comprising:

receiving circuitry configured to receive a signal from each of a plurality of satellites in a global positioning system;

frequency conversion circuitry configured to convert a frequency of the signal of each of the plurality of satellites received by the receiving circuitry into respective predetermined intermediate frequency signals;

synchronization acquisition circuitry configured to carry out synchronization acquisition to detect phase of a spread code of each of the plurality of predetermined intermediate frequency signals converted by the frequency conversion circuitry, and to detect a carrier frequency of each of the plurality of predetermined intermediate frequency signals;

synchronization holding circuitry configured to assign and set, for each of the plurality of satellites, the phase of the spread code detected by the synchronization acquisition circuitry and the carrier frequency detected by the synchronization acquisition circuitry to each of a plurality of channels independently provided in a corresponding manner to each of the plurality of the satellites, to hold, for each of the plurality of satellites, the set phase of the spread code and the set carrier frequency, and to demodulate a message included in each of the plurality of predetermined intermediate frequency signals; and control circuitry configured to execute operation control including position calculation of each of the plurality of satellites using the message demodulated by the synchronization holding circuitry, wherein the synchronization holding circuitry includes a plurality of spreading code generation circuitry portions each configured to generate a spreading code synchronized with the spread code of a corresponding one of the plurality of predetermined intermediate frequency signals, and to refer to a counter operating with a temperature-compensated clock oscillator oscillating at a predetermined frequency, and wherein, during a sleep period in which a positioning operation is not carried out, the synchronization holding circuitry causes only the plurality of spreading code generation circuitry portions and the counter to operate.

2. The receiving device according to claim 1, wherein each of the plurality of spreading code generation circuitry portions includes a corresponding numeric controlled oscillator, and wherein each of the spreading code generation circuitry portions is configured to generate the corresponding spreading code responsive to receiving an output signal from the corresponding numeric controlled oscillator.

3. The receiving device according to claim 2, wherein each of the numeric controlled oscillators is configured to hold a value thereof immediately before entering the sleep period as a value thereof in the sleep period.

4. The receiving device according to claim 2,
wherein the control circuitry is configured to calculate an average value from a plurality of values of each of the numeric controlled oscillators in a predetermined period immediately before entering the sleep period, and each of the numeric controlled oscillators is configured to hold average value as a value of the corresponding numeric controlled oscillator in the sleep period.

5. The receiving device according to claim 2,
wherein the control circuitry is configured to correct, for each said numeric controlled oscillator, a value of the corresponding numeric controlled oscillator at a time when the sleep period ends based on a change in amount of a Doppler shift of each of the plurality of satellites in the sleep period.

6. The receiving device according to claim 5,
wherein the control circuitry executes the correction before entering the sleep period using a time for returning from the sleep period.

7. The receiving device according to claim 1,
wherein the receiving circuitry, the frequency conversion circuitry, the synchronization acquisition circuitry, and the control circuitry are configured to stop operation in the sleep period.

8. A receiving method comprising:
receiving a signal from each of a plurality of satellites in a global positioning system;
converting a frequency of the received signal of each of the plurality of satellites into respective predetermined intermediate frequency signals;
carrying out synchronization acquisition to detect a phase of a spread code of each of the plurality of predetermined intermediate frequency signals, and detecting a carrier frequency of each of the plurality of predetermined intermediate frequency signals;
by using synchronization holding circuitry, which includes a plurality of spreading code generation circuitry portions, for generating a plurality of spreading codes synchronized with the spread code of corresponding predetermined intermediate frequency signals and referring to a counter operating with a temperature-compensated clock oscillator oscillating at a predetermined frequency,
assigning and setting, for each of the plurality of satellites, the detected phase of the spread code and the detected carrier frequency to each of a plurality of channels independently provided in a corresponding manner to each of the plurality of the satellites,
holding, for each of the plurality of satellites, the set phase of the spread code and the set carrier frequency, and
demodulating a message included in each of the plurality of predetermined intermediate frequency signals;
executing operation control including position calculation of each of the plurality of satellites using the demodulated message; and
during a sleep period in which a positioning operation is not carried out, the synchronization holding circuitry causes only the plurality of spreading code generation circuitry portions and the counter to operate.

9. A non-transitory computer-readable storage medium storing computer-readable instructions that, when executed, causes a computer to perform a method comprising:
receiving a signal from each of a plurality of satellites in a global positioning system;
converting a frequency of the received signal of each of the plurality of satellites into respective predetermined intermediate frequency signals;
carrying out synchronization acquisition to detect a phase of a spread code of each of the plurality of predetermined intermediate frequency signals, and detecting a carrier frequency of each of the plurality of predetermined intermediate frequency signals;
by using synchronization holding circuitry, which includes a plurality of spreading code generation circuitry portions, for generating a plurality of spreading codes synchronized with the spread code of corresponding predetermined intermediate frequency signals and referring to a counter operating with a temperature-compensated clock oscillator oscillating at a predetermined frequency,
assigning and setting, for each of the plurality of satellites, the detected phase of the spread code and the detected carrier frequency to each of a plurality of channels independently provided in a corresponding manner to each of the plurality of the satellites,
holding, for each of the plurality of satellites, the set phase of the spread code and the set carrier frequency, and
demodulating a message included in each of the plurality of predetermined intermediate frequency signals;
executing operation control including position calculation of each of the plurality of satellites using the demodulated message; and
during a sleep period in which a positioning operation is not carried out, the synchronization holding circuitry causes only the plurality of spreading code generation circuitry portions and the counter to operate.

10. A portable terminal for transmitting/receiving an instruction and information to/from the receiving device according to claim 1.

11. The receiving device according to claim 1, wherein the control circuitry is configured to execute the operation control including the position calculation of each of the plurality of satellites using the message demodulated by the synchronization holding circuitry to calculate a position of the receiving device.

12. The receiving device according to claim 1, wherein the control circuitry is configured to refer to a timer to determine when to start operation of the plurality of spreading code generation circuitry portions of the synchronization holding circuitry.

13. The receiving device according to claim 1, wherein the synchronization acquisition circuitry obtains a correlation signal by correlating the generated plurality of spreading codes and the spread code of each of the plurality of predetermined intermediate frequency signals.

14. The receiving device according to claim 13, wherein the synchronization acquisition circuitry includes a peak detector configured to detect a peak value of the correlation signal.

15. The receiving method according to claim 8, wherein said executing operation control including the position calculation of each of the plurality of satellites using the demodulated message includes calculating a position of a receiving device.

16. The receiving method according to claim 8, further comprising referring to a timer to determine when to start operation of the plurality of spreading code generation circuitry portions.

17. The receiving method according to claim 8, further comprising obtaining a correlation signal by correlating the generated plurality of spreading codes and the spread code of each of the plurality of predetermined intermediate frequency signals.

18. The receiving method according to claim 17, further comprising detecting a peak value of the correlation signal.

* * * * *